(12) United States Patent
Weiss et al.

(10) Patent No.: US 11,884,347 B2
(45) Date of Patent: Jan. 30, 2024

(54) MOTOR VEHICLE CONTROL

(71) Applicant: WEISS NOMINEES PTY LTD, Scarborough (AU)

(72) Inventors: Jan Weiss, Scarborough (AU); Richard Monk, Yalyalup (AU)

(73) Assignee: WEISS NOMINEES PTY LTD, Scarborough (AU)

( * ) Notice: Subject to any disclaimer, the term of this patent is extended or adjusted under 35 U.S.C. 154(b) by 0 days.

(21) Appl. No.: 17/904,929

(22) PCT Filed: Feb. 25, 2021

(86) PCT No.: PCT/AU2021/050163
§ 371 (c)(1),
(2) Date: Aug. 24, 2022

(87) PCT Pub. No.: WO2021/168512
PCT Pub. Date: Sep. 2, 2021

(65) Prior Publication Data
US 2023/0088275 A1 Mar. 23, 2023

(30) Foreign Application Priority Data

Feb. 25, 2020 (AU) ................................ 2020900530

(51) Int. Cl.
*B62D 9/02* (2006.01)
*B60G 13/00* (2006.01)
(Continued)

(52) U.S. Cl.
CPC ............. *B62D 9/02* (2013.01); *B60G 13/003* (2013.01); *B62D 6/002* (2013.01); *B62D 15/021* (2013.01);
(Continued)

(58) Field of Classification Search
CPC ........ B62D 9/02; B62D 6/002; B62D 15/021; B60G 13/003; B60G 2200/46; B60G 2300/122; B60G 2800/94
(Continued)

(56) References Cited

U.S. PATENT DOCUMENTS 6,942,053 B2   9/2005   Hinton
7,357,416 B2   4/2008   Wagner
(Continued)

FOREIGN PATENT DOCUMENTS

DE   10146623   1/2003
DE   10235576   2/2004
(Continued)

OTHER PUBLICATIONS

English Translation and Original Document (EP 1702773 A2) Laterally-leaning Vehicle, Kemp Hugh (Year: 2006).*
(Continued)

*Primary Examiner* — Paul N Dickson
*Assistant Examiner* — Caitlin Anne Miller
(74) *Attorney, Agent, or Firm* — HESLIN ROTHENBERG FARLEY & MESITI PC

(57) ABSTRACT

A vehicle (1) having: a chassis portion (2) and a tilting suspension arrangement (10) such that the chassis portion can tilt relative to ground; a tilt control arrangement (50) including at least a tilt controller and a tilt motor (48) to selectively apply a torque between the chassis portion (2) and at least one member (12) of the tilting suspension arrangement (10). The tilt controller has an active, tilt-controlled first mode (200) which adjusts a tilt angle (a) of the chassis towards an unstable equilibrium position using the tilt motor (48). The tilt controller has a primarily passive, free-tilt second mode (220) in which the tilt angle of the chassis is not adjusted for at least fifty percent of time. The
(Continued)

tilt controller selectively permits a transition between the first mode and the second mode in dependence on at least one operating parameter of the vehicle.

39 Claims, 9 Drawing Sheets

(51) Int. Cl.
    *B62D 6/00*         (2006.01)
    *B62D 15/02*       (2006.01)

(52) U.S. Cl.
    CPC .... *B60G 2200/46* (2013.01); *B60G 2300/122* (2013.01); *B60G 2800/94* (2013.01)

(58) Field of Classification Search
    USPC ................... 280/124.106, 124.103, 124.104
    See application file for complete search history.

(56) References Cited

U.S. PATENT DOCUMENTS

| | | | |
|---|---|---|---|
| 10,633,046 B2* | 4/2020 | van Wijk | B62K 5/10 |
| 2008/0197597 A1* | 8/2008 | Moulene | B62K 5/10 |
| | | | 280/5.509 |
| 2010/0044977 A1* | 2/2010 | Hughes | B62K 5/10 |
| | | | 280/5.509 |
| 2011/0006498 A1* | 1/2011 | Mercier | B62K 5/10 |
| | | | 280/124.103 |
| 2016/0059661 A1 | 3/2016 | Saeger et al. | |
| 2017/0291637 A1* | 10/2017 | Horiguchi | B62K 5/027 |
| 2018/0319242 A1 | 11/2018 | Goel | |
| 2019/0144035 A1* | 5/2019 | Doerksen | B62K 5/10 |
| | | | 280/124.103 |

FOREIGN PATENT DOCUMENTS

| | | | | |
|---|---|---|---|---|
| EP | 0097622 | | 1/1984 | |
| EP | 0097623 | | 1/1984 | |
| EP | 1702773 | | 9/2006 | |
| FR | 2399354 | | 3/1979 | |
| FR | 2467133 | | 4/1981 | |
| WO | 2002068228 | | 9/2002 | |
| WO | 2019030924 | | 2/2019 | |
| WO | 2019060966 | | 4/2019 | |
| WO | WO-2020117043 A1 * | 6/2020 | ........... B62D 31/003 |
| WO | 2020172335 | | 8/2020 | |

OTHER PUBLICATIONS

International Search Report and Written Opinion of the International Searching Authority for PCT/AU2021/050163, dated May 7, 2021, 16 pages.

* cited by examiner

MOTOR VEHICLE CONTROL

CROSS REFERENCE TO RELATED APPLICATIONS

This application is a national stage filing under section 371 of International Application No. PCT/AU2021/050163, filed on Feb. 25, 2021, and published on Sep. 2, 2021 as WO 2021/168512, which claims priority to Australian Application No. 2020900530, filed Feb. 25, 2020. The entire contents of each application are incorporated herein by reference in their entireties.

TECHNICAL FIELD

The present invention relates to motor vehicles and specifically relates to controls for tilting or leaning vehicles.

BACKGROUND

Single track vehicles are known with enclosures for the driver are known such as from European patent number EP0097622 in which one or two occupants are housed in a capsule suspended above a single front wheel and a single back wheel, in-line like a motorcycle. As the occupants are inside the capsule, when the vehicle is stationary, it would topple over if additional stabilisation were not provided.

U.S. Pat. No. 7,357,416 discloses a device for stabilising this type of single track vehicle, comprising support elements which are essentially stabiliser wheels controlled to swing out from the body by means of an actuator element. A control device and/or signals from the driver can be used to influence the actuating element which can also be selectively locked, unlocked, tensioned and extended. A control device for this arrangement is also disclosed in European patent number EP0097623.

However, the stabiliser wheels are small diameter and are not suspended, so can fall into potholes and sink into soft ground. Also, the control system supports the vehicle in an upright position, so when the stabilising wheels are raised, the operation of the vehicle changes from being: a "steerer" in which the driver simply steers in the direction they wish the vehicle to go; to a "counter-steerer" in which the driver must initially steer in the opposite direction to the direction they wish to go. This counter-steering operation is the operation type of a motorcycle, bicycle or similar vehicles having two in-line wheels. In vehicles of this type which switch between "steerer" and "counter-steerer" operation, if the driver makes inappropriate "steerer" type steering inputs immediately after raising the stabilising wheels the vehicle can quickly fall to one side and even topple over.

There are also similar retractable outrigger wheels or stabiliser wheels for single track vehicles shown in French patent application publication numbers FR2399354 and FR2467133, in German patent application publication number DE10146623 and in U.S. Pat. No. 6,942,053. An alternative in which the stabiliser wheels are allowed to maintain contact with the ground, but move in opposite directions to selectively allow roll of the vehicle is shown in German patent application publication number DE10235576.

The applicant has disclosed in International patent application publication number WO 2019/060966 a tilting vehicle having similar motorcycle-like tilting or leaning dynamics, with a chassis portion or body in which the driver cannot put their foot to the floor to stabilise the vehicle at rest. However in this disclosure the vehicle is not a single-track vehicle, but as shown in FIG. 1 has two laterally spaced front wheels 4a, 4b towards the front end of the vehicle in a front suspension arrangement 10. Although two similarly laterally spaced back wheels (only the back right wheel 7b is visible) are shown in a back suspension arrangement 60 towards the back end of the vehicle, the back suspension arrangement could alternatively comprise a single back wheel. A configuration where the laterally spaced wheels are back wheels and there is only one one wheel towards the front of the vehicle is also possible. The laterally spaced wheels 4a, 4b are pivotally connected at either end of at least one bridge member 14 which is also pivotally connected to the chassis portion 2 so that the wheels remain substantially parallel to the chassis portion at all times, whether the chassis portion is upright or leaning.

Relative motion between the chassis portion 2 and the at least one bridge member 14 can be damped by tilt damper 40. A tilt brake 46 can be provided, acting on tilt control disc 44, to enable the tilt or lean angle of the chassis portion 2 to be slowed or fixed. For example, it is important when stationary to prevent the chassis portion from falling to one side and when the vehicle is not moving forward it lacks the dynamic stability factors that motion brings such as the gyroscopic effects from each wheel and the ability to control lean by steering to move the wheel contact patches laterally with respect to the chassis centre of mass as the vehicle moves forward. The ability to selectively restrict or prevent the tilt or lean angle and the chassis portion 2 from changing by simply applying a brake 46 provides significant advantages over the above retractable outrigger or stabiliser wheel arrangements. There is no time required to engage such wheels with the ground, the tilt brake acting much faster and without moving parts external to the chassis portion. Similarly, there are no issues with possible high lateral accelerations caused by a rapid ground contact of a stabiliser forcing the vehicle perpendicular to the ground plane, or at least to a different lean angle to that prior to stabiliser deployment. Also there is no danger of having the stabiliser arrangement swing into or onto an adjacent object, vehicle, person or animal.

However, the tilt brake 46 can only restrict or prevent a roll displacement, i.e. a tilt or lean motion, but cannot correct it, so additionally or optionally a tilt motor 48 can also be provided to enable the tilt or lean angle of the vehicle to be driven as the driver cannot use their foot to adjust the tilt or lean angle of the chassis portion, unlike the rider of a motorcycle. The tilt motor 48 can be a rotary device, for example acting directly on the pivot of the bridge member, or as illustrated driving the tilt control disc 44 which is fixed to the bridge member 14. Alternatively the tilt motor can be a linear device provided for example as part of, or a similar element to the linear tilt damper 40.

One of the issues with preventing or stabilising tilt of the chassis portion of any of the above vehicles is that, while the vehicle is supported or stabilised in roll by the stabiliser wheels or tilt brake it essentially operates like a tricycle or car in that steering motions directly correspond to the trajectory of the vehicle. If the steering wheel or handlebars are turned to the right, the vehicle will go the right, i.e. it is a "steerer". However, when the tilt of the chassis portion is not prevented and the vehicle operates with similar dynamics to a motorcycle, then to turn to the right, a small initial steering motion to the left is required to move the (effective) contact patch of the wheels to the left of the position of the chassis centre of mass, thus causing the vehicle to lean to the right which makes it follow a path to the right as the steering is then for example straightened up, i.e. all such vehicles with motorcycle type dynamics are known as "counter-steerers".

As any of the above vehicles change from the tilt stabilised arrangement (stabiliser wheels down or tilt brake applied) to the free or passive tilting arrangement while running, it also therefore changes from being a "steerer" to a "counter-steerer". This issue has not been successfully addressed to date.

It would therefore be desirable to provide for a tilting vehicle, a control arrangement that overcomes one or more disadvantage of known arrangements.

SUMMARY OF INVENTION

According to a first aspect of the invention there is provided a vehicle having a chassis portion, a first suspension arrangement towards a first end of the vehicle and a second suspension arrangement towards an opposite (or second) end of the vehicle; the first suspension arrangement including a first left wheel laterally spaced from a first right wheel, each first wheel being connected to the chassis portion by at least one member such that the chassis portion can tilt; a tilt control arrangement including a tilt controller, a tilt motor and a tilt brake, the tilt motor and tilt brake each being operable to selectively apply a force or torque between the chassis portion and the at least one member of the first suspension arrangement; wherein: the tilt controller has in use at least a first mode and a second mode; in the first mode of the tilt controller, the tilt control arrangement controls a tilt angle of the chassis portion using the tilt motor and/or the tilt brake; when the tilt controller is operating in the first mode and the tilt motor is in use, the tilt motor adjusts the tilt angle of the chassis towards an unstable equilibrium position; in the second mode of the tilt controller, the vehicle has a positive forward velocity or speed and the tilt controller may not directly adjust the tilt angle of the chassis portion for at least 50% of time the vehicle is operating with the tilt controller in the second mode; the tilt controller operating in the first mode when the vehicle is stationary or before the vehicle accelerates above a first minimum speed; the tilt controller selectively permitting a transition between the first mode and the second mode in dependence on at least one operating parameter of the vehicle. The tilt controller may permit the transition from the first mode into the second mode when the at least one operating parameter provides an indication that the chassis is substantially in an unstable equilibrium position.

The first mode may be an active mode and/or tilt-controlled mode of the tilt control arrangement. The second mode may primarily be a passive mode and/or free-tilt mode of the tilt control arrangement. In the second mode, the chassis portion may be substantially in an unstable equilibrium position. In the second mode a driver may be balancing the tilt angle of the vehicle. This may be done by a driver making many or constant minor adjustments to the steering angle to maintain the tilt angle of the vehicle balanced around (i.e. at or near) the unstable equilibrium position. Therefore in the second mode, the chassis portion may primarily be balanced at or near the unstable equilibrium position. The tilt control arrangement may adjust the tilt angle of the chassis portion into an unstable equilibrium position at least up to a pre-set tilt angle or absolute lateral acceleration of the vehicle. The pre-set tilt angle or absolute lateral acceleration may be for example to prevent the tilt control arrangement from attempting to tilt the chassis portion to a greater angle than the limit of rotation between the chassis portion and the at least one member.

The at least one member may be a bridge member. For example, the wheel locating geometry of the two laterally spaced wheels may be as disclosed in the Applicant's International Patent application publication number WO2019/060966A1. In vehicles of this type, the wheels may tilt in same direction or sense as the chassis. Alternatively, the at least one member may be a double wishbone arrangement for each respective wheel, or a McPherson strut or other known wheel locating geometry arrangement.

When the vehicle is operating with the tilt controller in the second mode and the tilt controller does not directly adjust the tilt angle of the chassis portion for the at least 50% of time spent in this second mode, the tilt motor and tilt brake may for example provide substantially zero force or torque between the chassis portion and the at least one member of the first suspension arrangement (excluding damping forces). In this case, the vehicle may be primarily operating in a free-tilt mode, although there may optionally be tilt damping present at least periodically, to prevent excessive roll vibrations of the first suspension arrangement if required.

In the second (primarily free-tilt) mode the tilt motor and/or tilt brake and/or a tilt damper may be controlled to provide damping of tilt rotation between the at least one member and the chassis portion. However, in the second mode: the tilt motor may provide adjustment (i.e. direct drive) of the tilt angle for less than 50% (or 40%, 30%, 20%, 10% or 5%) of the operational time of the second mode; and the tilt brake may not lock the tilt angle of the chassis portion. In this case the tilt motor may be used for safety interventions or to drive the tilt angle of the vehicle into a turn if so directed by a driver. There may be a transition between the first mode and the second mode in dependence on at least one operating parameter of the vehicle.

The first mode may operate when the steering angle is substantially zero. For example, the first mode may only operate when the steering angle is substantially zero. The first mode may not operate when the steering angle is substantially non-zero. In this case the first mode may tilt the chassis portion to substantially compensate for offset loads in the vehicle or any external forces, excluding centrifugal force. However, the transition may then occur only during substantially straight line running of the vehicle.

Alternatively, the first mode may operate at any steering angle, i.e. regardless of steering angle. In this case, the first mode may tilt the chassis portion to substantially compensate for offset loads in the vehicle or any external forces, including centrifugal force. The transition may then occur when cornering as well as when running in a substantially straight line. If the first mode operates at any steering angle, then centrifugal force or absolute lateral acceleration of the vehicle may be inherently substantially compensated for when heading towards or achieving the unstable equilibrium position.

Alternatively, the first mode may operate when the steering angle is within a limited range of steering angle. The first mode may not operate when the steering angle is outside (or not within) a limited range of steering angle. The limited range of steering angle may be varied with speed.

The transition may include triggering a warning. The warning may be at least one of a light, an image, a sound or a vibration.

When the transition is from the first mode to the second mode, the at least one operating parameter may include vehicle speed and a signal indicative of an equilibrium state of the chassis portion, the controller selectively transitioning into the second mode when: the vehicle speed is greater than the first minimum speed; the signal indicative of an equilibrium state of the chassis portion indicates unstable equilibrium; and/or the steering position is within a required range. The required range for the steering position may be a calculated value in dependence on other operating parameters such as vehicle speed, chassis tilt angle and/or a tilt moment or force between the chassis portion and the at least one member of the first suspension arrangement.

Alternatively, the tilt controller may selectively transition into the second mode only when at least one additional constraint is met, the at least one additional constraint including at least one of the following: the vehicle speed is less than a first maximum speed; a steering position is substantially aligned with a predicted or calculated steering position required for the unstable equilibrium with zero force or torque required from the tilt motor and/or tilt brake between the chassis and the at least one member of the suspension system; an acceleration or throttle position is of sufficient magnitude to indicate that the first minimum speed will be exceeded and/or maintained. For example, vehicle operation may be modelled and an effect of releasing the tilt motor/brake control with current operating parameters may be predicted before releasing said tilt control. In this case, the predicted operation of the vehicle not exceeding safety parameters may be one such additional constraint. The at least one additional constraint may additionally or alternatively include that a steering position is substantially aligned with a straight ahead position, such that the vehicle is running in a straight line. The additional constraint may additionally or alternatively include that the unstable equilibrium position is indicated or verified by a zero force or torque from the tilt motor and/or tilt brake between the chassis and the at least one member of the suspension system.

The first mode may be a "steering" mode and the second mode may be a "counter-steering" mode. For example, a free-tilting vehicle with steering at the front wheels is a "steerer" when the tilt angle is locked and a "counter-steerer" when the body is free to tilt. So the first mode may be a steering mode or a tilt-locked mode or a transition mode and the second mode may be a steering mode or a free-tilt mode or an unlocked tilt mode. Alternatively, a free-tilting vehicle with steering at the rear wheels is a "steerer" whether the tilt angle of the body portion is locked or free, in which case the first mode may be a tilt-locked mode or a transition mode and the second mode may be a free-tilt or an unlocked tilt mode.

In the first mode the tilt angle may be actively controlled and in the second mode the tilt angle may be primarily passively controlled. For example, the tilt control arrangement may provide a force or torque between the chassis portion and the at least one member during less than 50% (or less than 40%, or less than 30%, or less than 20%, or less than 10%, or less than 5%) of the time that the vehicle is operating in the second mode. Alternatively or additionally, in the second mode, the tilt control arrangement may only provide force or torque between the chassis portion and the at least one member for safety intervention operations.

When the transition is from the second mode into the first mode, the at least one operating parameter may include vehicle speed. in this case, the controller may selectively transition into the first mode when the speed falls below a second minimum speed.

The first mode may be a "steering" mode and the at least a second mode may include the second mode and a third mode; the second mode being a normal operation mode or "counter-steering" mode. The third mode may be a safety mode. For example, a safety mode may be a limited function mode for use if multiple sensor failure makes the normal second mode potentially hazardous through inability to provide stability functionality such as safe-path-following (trajectory, yaw controlling) Electronic Stability Program (ESP).

Similarly the first mode may be a tilt-controlled mode which may include an active tilt mode and at least one tilt-locked mode such as a standstill stabilising mode and a crawl or manoeuvring mode. The standstill stabilising mode may ensure the vehicle is stable when at a standstill without a crawl or manoeuvring mode selected and allow transition into normal or tilt-unlocked mode when conditions are met indicating it is safe to do so. The crawl or manoeuvring mode may be selected by the driver when manoeuvring, for example in car parks, or at other times when speeds are low and the vehicle is preferred to operate in a tilt-locked mode. The safety mode can still be applied.

Alternatively, the third mode may be a limited mode. For example, at least one of the following may be limited: vehicle speed; adjustment of the tilt angle, which may be locked and vehicle speed limited as in crawl mode but to allow a greater speed as a limp home mode; rate of response time of the tilt controller; frequency of response of the tilt controller; operation of any stability or assist systems such as ESP (the third mode could be a track mode) in dependence on at least one parameter selected from operating parameters, sensor inputs and/or driver inputs. Alternatively or additionally, the tilt controller operation may be reduced or adapted when the driver manually switches off at least one stability or assist system, such as safe-path-following ESP, wind assist, high-sider prevention assist and/or topple over prevention. The transition between modes may be automatic or driver initiated.

The first mode may include an active tilt mode and a tilt-locked mode. For example, the vehicle may be tilt-locked in the unstable equilibrium position and may transition from the tilt-locked position of the first mode into the second mode in dependence on at least one operating parameter.

Additionally or alternatively, the tilt controller may further include a passive tilt-locked mode. This may for example be park mode and/or a crawl or manoeuvring mode or similar in which the tilt brake is applied and the tilt angle of the vehicle is not adjusted. When the vehicle is started, the tilt controller may be in the passive tilt-locked mode, then may either remain in passive tilt-locked mode or switch into the first mode, as directed by a driver or user. For example, the tilt controller may be in the passive tilt-locked mode, then enter the first mode, then transition into the second mode. The second mode being the primarily passive free-tilting mode. So in such an example, the vehicle tilt controller may be in a passive mode in which it is a steerer, then enter a controlled mode in which it is still a steerer, then transition to a primarily passive mode in which it is a counter-steerer.

In the first mode, the tilt control arrangement may adjust the tilt angle of the chassis portion in dependence on at least one operating parameter.

The at least one operating parameter may include: an indication that the vehicle is in an unstable equilibrium position; vehicle speed; a force and/or torque between the chassis portion and the tilt motor and/or tilt brake; a tilt position and/or tilt velocity and/or tilt acceleration; a suspension force and/or a tyre force ([the suspension force can be from a suspension mount, a spring compression or any other strain or displacement; a longitudinal acceleration and/or a throttle position; a steering position and/or lateral acceleration (measured relative to the chassis portion orientation and/or absolute); and/or an absolute orientation (at least one from pitch, roll and yaw angle, for example the vehicle or the tilt control arrangement or the tilt controller may include an inertial measurement unit.

The at least one operating parameter may be measured, calculated or predicted.

In operation, the first left wheel and the first right wheel may each be in contact with the ground at a respective contact patch. The tilt angle of the chassis portion may be a rotation of the chassis portion relative to a virtual line between the first left and first right contact patches. Alternatively, the tilt angle of the chassis portion may be a measure of the angle between a chassis centre line oriented vertical with respect to the chassis portion and a perpendicular line oriented perpendicular to the virtual line between the first left and first right contact patches.

Alternatively, the tilt angle of the chassis portion may be a measure of the angle between a chassis centre line oriented vertical with respect to the chassis portion and a perpendicular line orientated perpendicular to a ground plane on which the vehicle rests. Alternatively, the tilt angle of the vehicle may be a measure of the rotation of the chassis portion about an axis oriented primarily longitudinally relative to the chassis portion of the vehicle. The rotation of the chassis portion may be about a roll axis or an axis parallel to the roll axis, the roll axis may be an axis oriented primarily longitudinally relative to the chassis portion of the vehicle.

The unstable equilibrium position may be a tilt angle at which all forces and moments on the chassis portion are balanced and there is substantially zero force or torque applied by the tilt motor and tilt brake between the chassis portion and the at least one member of the first suspension arrangement. Alternatively, the unstable equilibrium position may be a position in which, in the absence of any tilt braking force/torque or tilt motor force/torque, the tilt position of the chassis portion is in equilibrium. Alternatively, the unstable equilibrium position may be a position in which the tilt position of the chassis portion is in equilibrium and the tilt braking force is zero and the tilt motor force is zero.

Alternatively, the unstable equilibrium position may be a state of equilibrium of the chassis portion such that when the tilt angle of the chassis portion is slightly displaced, it departs further from the original position.

Alternatively, the unstable equilibrium position may be a balanced tilt angle position of the chassis portion in which the chassis portion is in a state of equilibrium, such that when (the tilt angle of) the chassis portion is slightly displaced from the balanced tilt angle position, it experiences a net force or torque in the same direction as the displacement from the balanced tilt angle position.

The tilt brake may be selectively operable by a driver of the vehicle. For example, a lever may be provided for the driver to operate to actuate the tilt brake. Alternatively, a button or switch may be provided for the driver to actuate the tilt brake electrically or electro-mechanically.

The tilt control arrangement may be controlled by a driver. For example, a variable displacement device may be provided for a left hand and a right hand of a driver (such as two paddles, or a single paddle that is displaceable rotationally and linearly). In this left and right hand variable displacement device example: when the left hand variable displacement device is operated, then the tilt controller adjusts the tilt angle of the chassis portion to the left or in an anti-clockwise direction; when the right hand variable displacement device is operated, the tilt controller adjusts the tilt angle of the chassis portion to the right or in a clockwise direction; and when the left and right hand variable displacement device(s) is operated together, the tilt controller resists changes to the tilt angle or applies a tilt braking force or moment or applies the tilt brake. Alternatively or additionally, when the left and right hand variable displacement device(s) is operated by at least a mode change threshold displacement or in a mode change direction, then a crawl mode or a manoeuvring mode may be engaged.

In one or more forms of the present invention, the at least one member may include at least a first bridge member, the tilt motor adjusting the tilt angle of the chassis portion relative to the first bridge member. Alternatively, or additionally, the tilt motor may be or include a motor-generator to adjust and damp the tilt angle of the chassis portion relative to the at least one member. In this case for example, the tilt motor may be a motor-generator.

The tilt brake may selectively lock the tilt angle of the chassis portion relative to the at least one member. For example, the tilt brake may be or include a locking pin to prevent the tilt angle from changing when the vehicle is stationary, not powered, not in use or as a fail-safe in the event of a failure such as of another part of the tilt control arrangement.

The first left wheel and the first right wheel connected to the chassis portion by at least one member (such that the chassis portion can tilt) may be connected such that they individually tilt in a similar direction to the chassis portion. Alternatively, the first left wheel and the first right wheel connected to the chassis portion by the at least one member may be connected such that they remain substantially parallel to the chassis portion.

The at least one member may include a first bridge. The at least one member may additionally include a second bridge. Alternatively the at least one member may additionally include a left link and a right link.

The unstable equilibrium position may inherently accommodate side slopes. For example, side slopes may be where a contact patch of the first left wheel is higher or lower than a contact patch of the first right wheel. In a perfectly balanced chassis (i.e. balanced left to right or in a roll direction) and without other loads such as cross wind loads or turning loads or displacements, the chassis portion may preferably be upright when in the unstable equilibrium position.

Additionally or alternatively the unstable equilibrium position may inherently compensate for cross winds. Cross winds may generate a roll moment on the chassis portion due to the wind loads. For example, the chassis portion may be leaned into a cross wind when in the unstable equilibrium position.

In one or more forms of the present invention, the chassis portion may include a driver seat and a passenger seat position. The passenger seat position may include a passenger seat. Additionally or alternatively an additional battery framework or mounting points for additional batteries may be provided in the passenger seat position. The tilt control arrangement or the vehicle may further include at least one passenger seat position sensor to detect a presence or weight of a passenger and/or a presence or weight of additional batteries. The tilt controller operation may be dependent in at least one mode on an output from the at least one passenger seat position sensor. For example, as the mass magnitude and position change in dependence on whether the passenger seat position is vacant or occupied, operating parameters for the tilt control may be changed, Similarly parameters for any other systems such as safety systems may be changed. Additionally or alternatively, if additional batteries are present, the power and performance of the vehicle may be increased and/or operating parameters for the tilt control may be changed.

The tilt control arrangement may include a tilt damper. The tilt damper may be controlled by the tilt controller.

Another aspect of the present invention provides a vehicle having a chassis portion, a first suspension arrangement towards a first end of the vehicle and a second suspension arrangement towards an opposite (or second) end of the vehicle; the first suspension arrangement including a first left wheel laterally spaced from a first right wheel, each first wheel being connected to the chassis portion by at least one member such that the chassis portion and the first left and first right wheels can tilt; a tilt control arrangement for adjusting a tilt angle of the chassis portion; the tilt control arrangement maintaining an orientation of the chassis portion parallel to a direction of a line of action of a sum of centrifugal force, gravitational force and any eccentric loads such as wind loads, or the tilt control arrangement adjusting the tilt angle of the chassis portion towards an orientation parallel to a direction of a line of action of a sum of centrifugal force, gravitational force and any eccentric loads such as wind loads. The above-described orientation of the chassis portion parallel to a line of action of a sum of centrifugal force, gravitational force and any eccentric loads such as wind loads may be known as an unstable equilibrium position or a force neutral position. The chassis portion may be maintained or adjusted towards this orientation when the tilt controller is operating in a first mode.

Another aspect of the present invention provides a vehicle having a chassis portion, a first suspension arrangement towards a first end of the vehicle and a second suspension arrangement towards an opposite (or second) end of the vehicle; the first suspension arrangement including a first left wheel laterally spaced from a first right wheel, each first wheel being connected to the chassis portion by at least one member such that the chassis portion and the first left and first right wheels can tilt; a tilt control arrangement for adjusting a tilt angle of the chassis portion into an unstable equilibrium position. When the vehicle is balanced in (or at the top of) an unstable equilibrium position, (any slight roll or) tilt rotation to either side may generate a rolling moment on the chassis portion to roll the chassis portion further to that side, in the absence of tilt control force (such as from a tilt brake and/or a tilt motor).

Another aspect of the present invention provides a vehicle having a chassis portion, a first suspension arrangement towards a first end of the vehicle and a second suspension arrangement towards an opposite (or second) end of the vehicle; the first suspension arrangement including a first left wheel laterally spaced from a first right wheel, each first wheel being connected to the chassis portion by at least one member such that the chassis portion and the first left and first right wheels can tilt; a tilt control arrangement for adjusting a tilt angle of the chassis portion into a force neutral position. The force neutral position may be the tilt angle at which the force on the left and right wheels is balanced. Alternatively, the force neutral position may be a position where (in which) the rotational moment on the chassis portion relative to the at least one member of the first suspension arrangement is zero. The rotational moment can be measured at a tilt motor shaft. Alternatively the rotational moment can be measured as a force in a linear actuator or linear actuator mount where the linear actuator is driven by the tilt motor.

One or more forms of the present invention may provide a tilt controller or a tilt control arrangement as described above for a tilting vehicle as disclosed.

It will be convenient to further describe the invention by reference to the accompanying drawings which illustrate preferred aspects of the invention. Other embodiments of the invention are possible and consequently particularity of the accompanying drawings is not to be understood as superseding the generality of the preceding description of the invention.

DESCRIPTION OF SPECIFIC EMBODIMENTS

Figure 1:
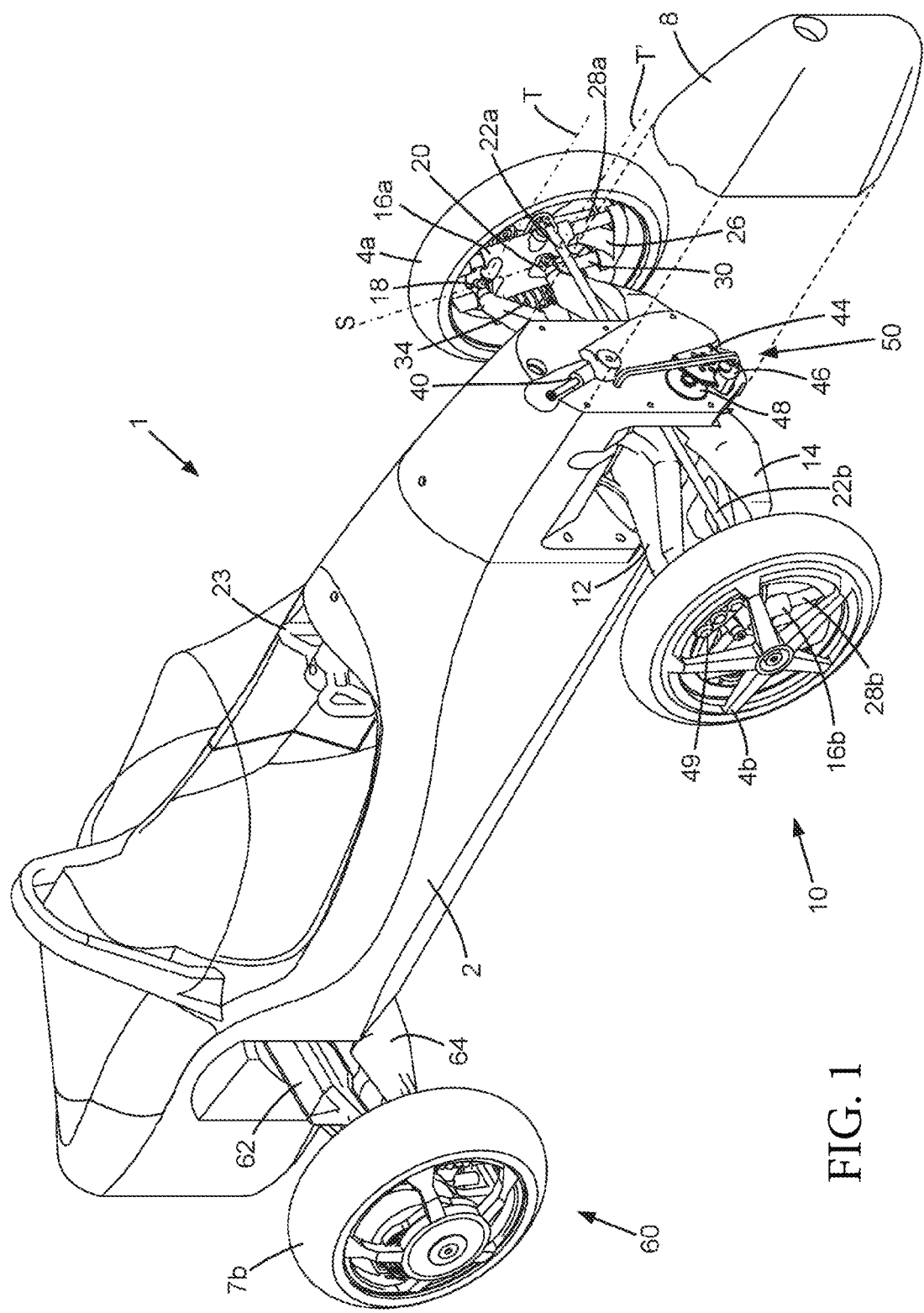
FIG. 1 is a partially exploded perspective view of a vehicle according to the present invention.

Referring initially to FIG. 1, the nose 8 of the chassis portion 2 is shown exploded to enable the tilt control disc 44, tilt brake 46 and tilt motor 48 of the tilt control arrangement 50 to be seen. It also allows the front suspension arrangement 10 to be seen more clearly. The front left wheel 4a and front right wheel 4b are carried on respective hub carriers 26 which include respective first guide rods 28a, 28b and along second guide rod 30, allowing the hub carriers to slide relative to the respective left or right upright 16a, 16b against the resilience of a respective coil spring 34 and damper arrangement. Each upright 16a, 16b is rotatably connected to at least one upper member 12 and at least one lower member 14. In this example: the at least one upper member 12 is a single bridge rotatably connected to the left upright 16a at connection 18 and to the right upright 16b and pivoted to the chassis portion 2; the at least one lower member 14 is a single bridge rotatably connected to the left upright 16a at connection 20 and to the right upright 16b and pivoted to the chassis portion 2; the upper member 12, lower member 14, left upright 16a and right upright 16b together forming a parallelogram, keeping the left and right wheel 4a, 4b parallel to the chassis portion as the chassis portion tilts. If the upper member 12 or the lower member 14 is replaced with two links, as opposed to being a single member, the at least one upper member, lower member and the left and right uprights do not need to form a parallelogram, allowing for the camber of the left and right wheels to vary as the vehicle tilts.

The rotatable connections 18, 20 locate upper tilt axis T and lower tilt axis T' for the front left wheel assembly. The rotatable connections in this example also allow rotation about a steering axis S, the steering angle of the front left wheel 4a being controlled by the left steering rod 22a, with a similar steering rod 22b being provided for the front right wheel 4b. Steering wheel 23 controls the steering rods 22a, 22b.

A similar arrangement without the steering ability is shown at the rear of the vehicle shown in FIG. 1, the back suspension arrangement 60 including an upper member 62 and a lower member 64 for left and right wheels, only the back right wheel 7b being visible in FIG. 1.

The front and back suspension arrangements 10, 60 are arranged to allow the vehicle to lean into corners like a motorcycle, with the chassis portion 2 and the front and back wheels leaning in unison. This can allow motorcycle dynamics to be provided, i.e when in motion the vehicle can be operated without forces from the tilt control arrangement 50, as like a motorcycle, it can be placed in a force balanced position in which steady state operation can be maintained. The force balanced position or force neutral position is a position of unstable equilibrium, that is a position from which any new tilt displacement will generate a roll moment due to that new tilt displacement, causing the chassis portion to accelerate in roll in the same direction as the new tilt displacement. As with a motorcycle, the driver can steer the front wheels 4a, 4b using the steering wheel 23 (or handle-bar or analogous feature) to maintain the unstable equilibrium position in either straight line or around a curve and initiate roll or tilt displacement to move from straight line running, to cornering, and back to straight line running as required when in motion.

Figure 2:
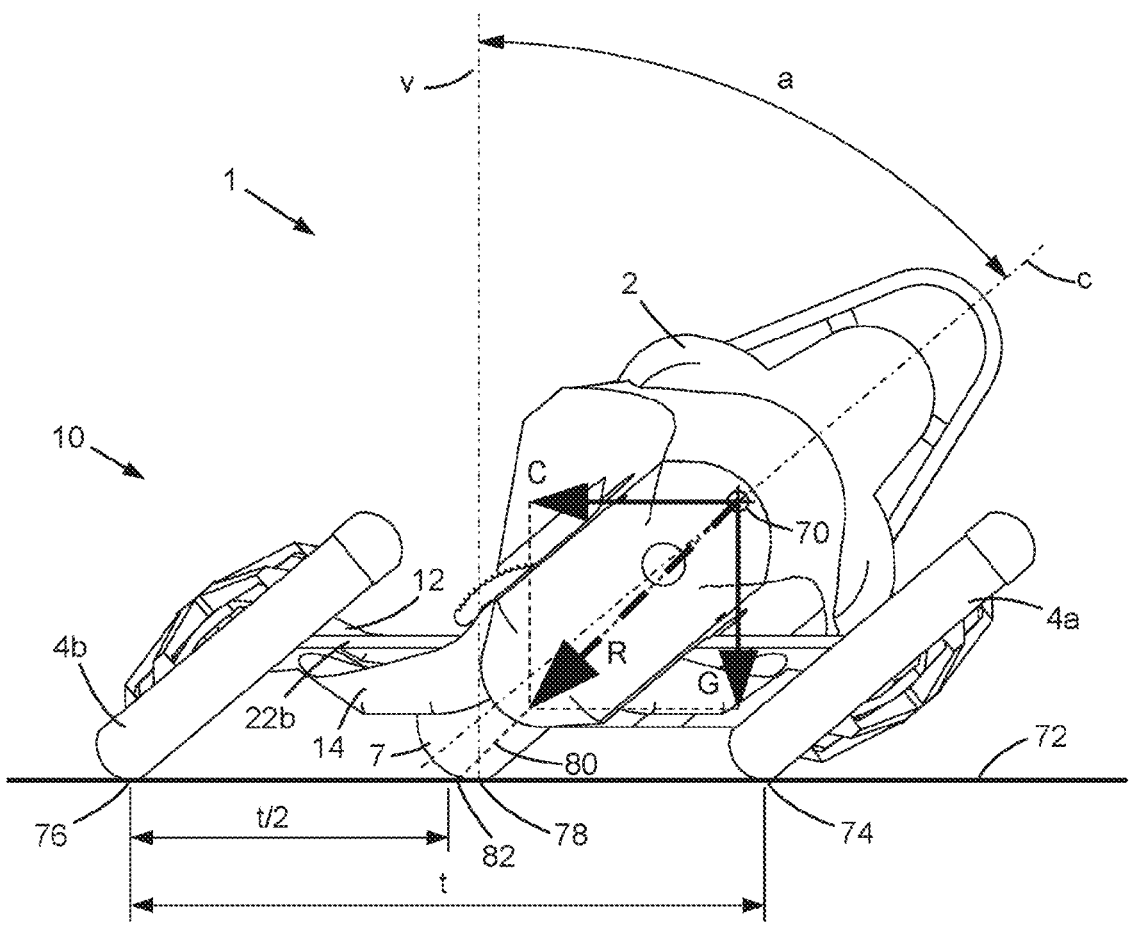
FIG. 2 is a front view of a vehicle according to the present invention, in a turn.

FIG. 2 shows a similar vehicle to FIG. 1, but having only one back wheel 7. The single back wheel can be like a motorcycle back wheel and the front suspension arrangement 10 is similar to that of FIG. 1 having an upper member 12 or upper bridge member and a lower member 14 or lower bridge member. In FIG. 2 the vehicle 1 is shown leaned into a turn to the vehicle's left, i.e. towards the right side of the page in this front view. The vehicle is shown in the unstable equilibrium position for the turn. Centrifugal force 'C' acts laterally on the centre of mass 70 due to the lateral acceleration of the chassis portion 2 due to the turn. Gravitational force 'G' acts vertically on the centre of mass 70 i.e. the weight of the vehicle chassis portion 2. The resultant force CR' of the gravitational and centrifugal forces 'C', 'G' acts through the effective centre of the contact patches 74, 76, 78 of the front left, front right and back wheels with the ground 72.

The front wheels 4a, 4b have a track width 't' and as they lean or tilt the respective contact patches 74, 76 move inwards in the turn by an amount determined by the shape of the tyre and the angle of tilt of each wheel. If the wheels tilt by the same angle as each other, then the track 't' will remain the same length. The resultant force 'R' is reacted by the front wheels 4a, 4b at the centre of the front track, in the position indicated by the 't/2' dimension, and by the back wheel 7 at its contact patch 78, which due to the usually larger width of the back tyre will be further away from the vehicle centre line 'c' toward the inside of the turn. So in the front view of FIG. 2, the resultant force CR' on the chassis portion 2 has a line of action 80 that intersects the ground 72 at a point 82 between the centre of the front wheel contact patches (at 't/2') and the back wheel contact patch 78 when cornering in an unstable equilibrium position as shown.

Due to the displacement of the contact patches of the wheels towards the centre of the turn when tilting, the line of action 80 of the resultant force "R' on the chassis portion 2 is less angled from the vertical cv' than the centre-line 'c' of the chassis portion 2. In the example shown, the vehicle is cornering steady state, in the unstable equilibrium position at 1g lateral acceleration, so the line of action 80 of the resultant force 'R' is 45 degrees from the vertical line cv' perpendicular to the ground (since the gravitational force 'G' is also 1g on level ground). However, for that line of action of the resultant force 'R' to intersect the ground at the necessary point 82 between the effective front and back contact patches, the vehicle 1 must lean more than the line of action 80 of the resultant force 'R'. In this 1 g cornering example, the centre-line 'c' of the chassis portion 2 of this particular vehicle 1 must lean at a tilt angle 'a' of approximately 50 degrees to the vertical cv' for the vehicle to negotiate the turn in steady state unstable equilibrium.

No force is required from the tilt control arrangement in the steady state cornering condition shown in FIG. 2. However, if a bump, or a gust of cross-wind is encountered, the steady state can be upset and ideally the driver reacts and corrects as a motorcycle rider would when such an input is encountered that unsettles the steady state running of the vehicle. Additionally, the tilt control arrangement of the present invention can provide a safety net by modelling the unstable equilibrium position of the vehicle and assessing the steering position to see whether the driver is providing corrective inputs and whether the predicted outcome will result in an unsafe situation such as an uncontrolled tilt not reacted by the driver, then providing tilt angle correction using the tilt motor if necessary, which is not possible with a two-wheeled motorcycle.

Throughout this specification, the unstable equilibrium position to which the tilt control arrangement urges the vehicle must, in the control sense or meaning in the program, include a tolerance range either side of the theoretical unstable equilibrium position. This is not only to allow the driver the opportunity to make corrective inputs in some situations, but also to prevent over-activity of the tilt control arrangements in other situations. Such a "dead-band" or tolerance range is a feature or method typically used in many control systems of reducing chatter or unnecessary small corrective operations when the error from the desired position is extremely small. Indeed an equivalent alternative to such a feature can exist in control systems by virtue of a filter to prevent control operations above a chosen frequency, which essentially prevents unwanted low magnitude actuations, so can be said to effectively provide a tolerance range by a different method and for the purposes of this invention all such equivalent or similar effect methods are intended to by captured by the general term "tolerance range", To provide an example of one such tolerance range, an angular tolerance can be applied to the tilt angle of the unstable equilibrium position. For example, when at low speed, while the unstable equilibrium position is still similar to balancing on a knife-edge compared to at higher speeds, at the low speed a given magnitude error between the speed, steering angle and external forces which determine the unstable equilibrium position can produce a slower tilt acceleration than a similar magnitude error at higher speeds so the tolerance range about the unstable equilibrium position tilt angle can vary as a function of vehicle speed.

Also, when the vehicle is in the unstable equilibrium position, if the tilt brake or tilt motor applies a force, it will move the vehicle away from the unstable equilibrium position. Therefore, theoretically, the tilt torque from the tilt brake should be zero in the unstable equilibrium position unless there is tilt rotational inertia driving the vehicle through the unstable equilibrium position. However as the unstable equilibrium position is a precise position, even the slightest variation in tilt angle or input force (e.g. from a slight cross wind, minor camber change or tiny bump input) can theoretically cause the tilt brake or tilt motor to apply a torque, albeit a minimal or extremely minor, insignificant torque. Then, as discussed immediately above, the use of a tolerance on the unstable equilibrium position is required to prevent undesirable control operations. If only the tilt brake is applied, while the tilt position of the body may be classed as stable due to the tilt brake essentially locking the tilt attitude of the vehicle, this effectively remains in the unstable equilibrium position in terms of control whilst within the tolerance range, Once outside the tolerance range, either the program must actuate the tilt motor to return the tilt angle of the vehicle within the unstable equilibrium tolerance range defined, or the vehicle becomes defined as being in a stable position that is no longer within the unstable equilibrium position tolerance range.

Preferably, the unstable equilibrium position tolerance range is at least 0.1 degrees or preferably at least 0.05 degrees or preferably at least 0.01 degrees. Preferably the unstable equilibrium position tolerance range is less than +/−3 degrees, preferably less than 2 degrees or preferably less than 1 degree. For example the unstable equilibrium position for the purposes of this invention can incorporate a tolerance range of 3 degrees at speeds below 10 kph and while varying (reducing) with speed as discussed above, may be never less than 0.01 degree either side of the precise (theoretical) unstable equilibrium position to avoid unnecessary tilt angle control interventions by the tilt control arrangement.

Figure 3:
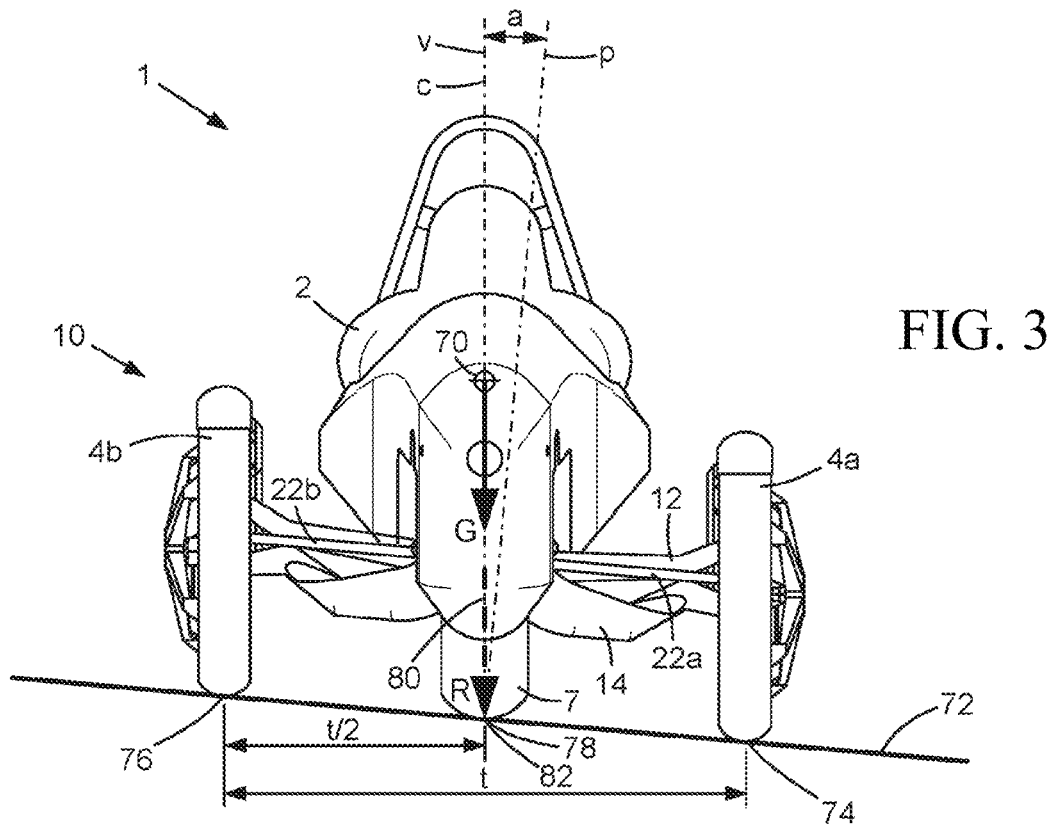
FIG. 3 is a front view of the vehicle of FIG. 2 on a side slope.

FIG. 3 shows the vehicle 1 in the unstable equilibrium position on a side slope where the ground surface 72 slopes laterally relative to the vehicle. The gravitational force 'G' acts on the centre of mass 70 of the chassis portion 2 in a vertical direction along the line cv'. As there are no offset forces or other moments acting on the chassis portion 2 in this example, the resultant force 'R' is the same as the gravitational force 'G', having a vertical line of action 80 through the contact patch 78 of the back wheel and the effective contact patch of the front wheels 4a, 4b which is at the point indicated by 't/2' being half of the track 't' between the contact patches 74, 76 of the front wheels. As the size of the side slope increases, there will be a small lateral displacement of the contact patch of each tyre, so with larger side slopes, the line of action 80 of the resultant force 'R' must act through the effective contact patch of all the wheels, but as it is due only to gravity, must act vertically, so the tilt angle 'a' of the chassis portion will move slightly. That is, the centre-line of the chassis portion will be at a larger tilt angle 'a' from the line ID' perpendicular to the ground than the vertical line cv' as the angle of side slope increases due to the lateral change in contact patch 74, 76, 78 between the rounded tyre of each wheel 4a, 4b, 7 and the ground with relative roll or tilt rotation between wheel and ground.

When the vehicle 1 is stationary, the driver cannot use the steering to move the effective contact patch of the front wheels (at the centre of the front track T) laterally relative to the centre of mass and therefore arrive at or maintain unstable equilibrium while stationary. Therefore a method of locking the chassis portion from tilting freely relative to the at least one member 14 is required, such as the tilt brake shown in FIG. 1. For the vehicle to be able to start from zero speed, the tilt control arrangement adjusts the tilt angle 'a' of the chassis portion 2 (relative to a line ID' perpendicular to ground 72) to or towards the unstable equilibrium position at that instant. As the vehicle 1 gains even a small forward velocity, the driver can then use the steering to maintain an unstable equilibrium position. However for the tilt controller to be able to safely release the tilt control provided by the tilt brake and/or tilt motor which has been controlling the tilt angle 'a' of the chassis portion 2, the vehicle 1 must be substantially in a position of unstable equilibrium with the steering in the correct position for passive free-tilt operation and the forward velocity of the vehicle must be sufficient to allow the driver to maintain the chassis portion 2 substantially in a position of unstable equilibrium using the steering as required.

Figure 4:
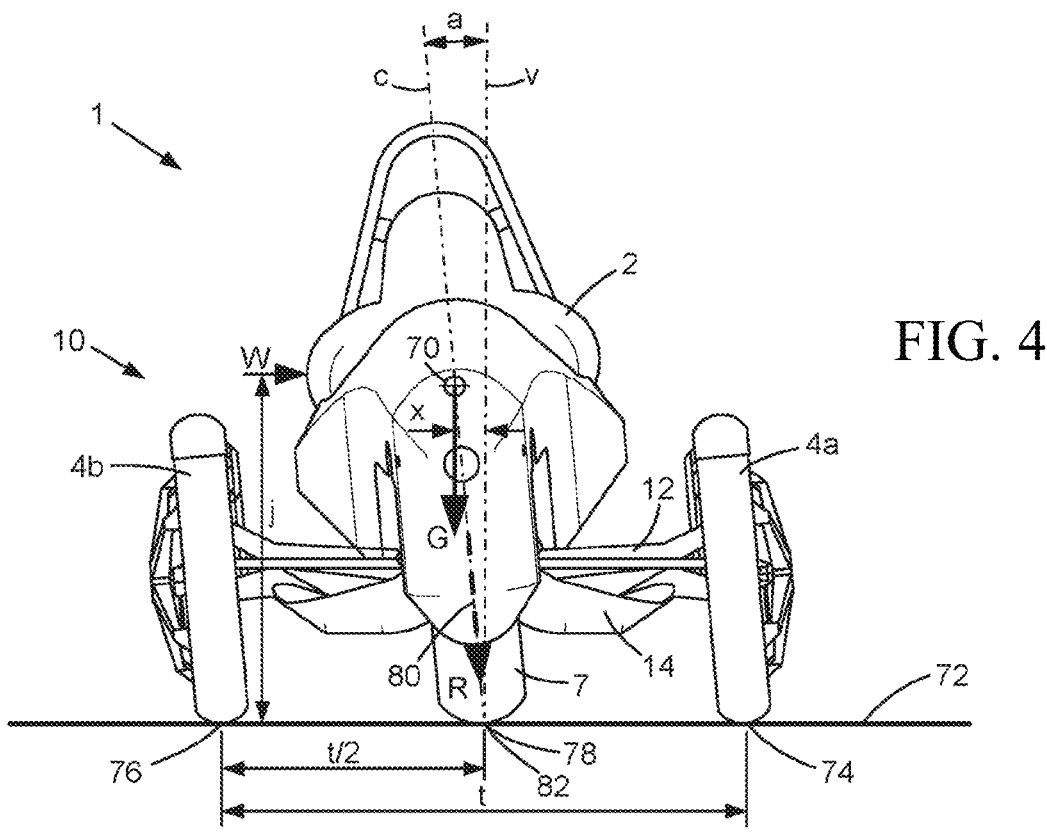
FIG. 4 is a front view of the vehicle of FIG. 2 in a cross-wind.

FIG. 4 shows the three-wheeled tilting vehicle of FIGS. 2 and 3 undergoing another effect that ideally needs to be taken into account when ensuring that the vehicle is in a true force balanced or force neutral position, i.e. in unstable equilibrium, that is the effect of side winds. When a side wind or cross-wind acts on the chassis portion 2, producing a lateral force W, that lateral force will have a line of action that acts on the chassis portion at a height T determined by a function of the side area shape of the chassis portion 2 and the lateral aerodynamic profile characteristics of the chassis portion along with a small element acting on the wheels 4a, 4b, 7.

The resultant force 'R', now due to the combination of the gravitational force 'G' acting on the centre of mass 70 of the chassis portion and the cross-wind force 'W' acting on the vehicle against acts along the line of action 80 which must intersect the ground 72 at point 82. For clarity, the cross-wind force 'W is not shown to scale and the resultant force CR' is shown along the line of action 80 away from, but still effectively acting through the centre of mass 70. For the vehicle to be in unstable equilibrium, the centre-line 'c' of the vehicle must be tilted until the point 82 (at which the line of action 80 of the resultant force 'R' intersects the ground 72) coincides with the effective contact patch of the tyres of the front and back wheels. This results in a lateral displacement 'x' of the centre of mass 70 of the chassis portion 2 into the direction the cross-wind force W is coming from, 'x' being measured from the vertical line cv' through the effective contact patch of all the tyres of the wheels. Essentially the force balance of the unstable equilibrium in this case come from the moment generated by the gravitational force 'G' at a distance of 'x' from the effective contact patch of the wheels with the ground, being equal and opposite to the moment generated by the cross-wind force 'W' acting at a height of T above the ground. This condition is met when the line of action 80 of the resultant force 'R' from gravitational and cross-wind forces 'G', 'W' intersects the ground 72 at the point 82 where the effective contact patch of the front wheels and the back wheel is located.

The effects of side slopes and cross-winds can be incorporated into and accommodated by the tilt controller of the tilt control arrangement, while stationary, or while moving and can be combined with the effects of cornering and the effects of an offset load that moves the centre of mass 70 laterally away from the vehicle centre-line Indeed any controller that calculates or predicts the unstable equilibrium position of the chassis (i.e. the tilt angle at which the forces and moments on the chassis portion are balanced), preferably incorporates or accommodates all such factors.

Figure 5:
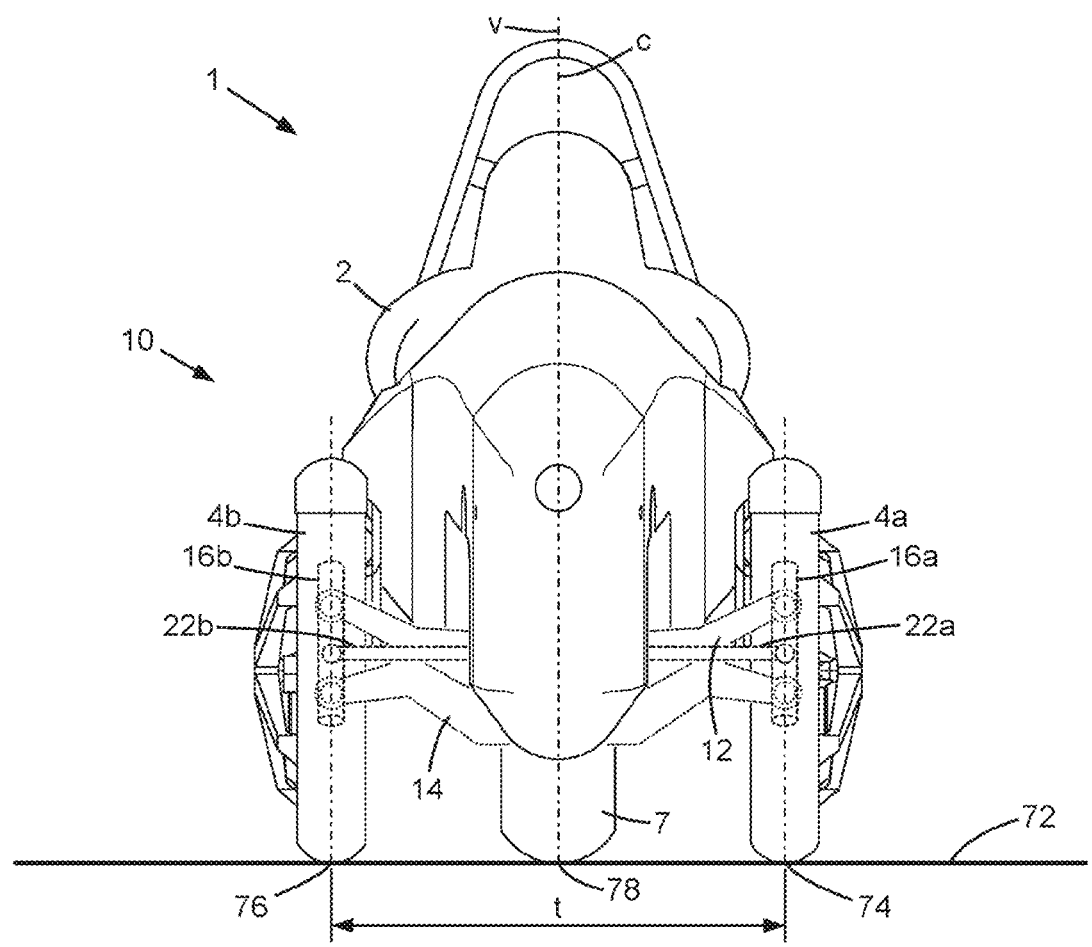
FIG. 5 is a front view of a vehicle according to the present invention.

FIG. 5 shows a narrow track version of the vehicle of FIGS. 2 to 4. The at least one member includes an upper bridge member 12 and a lower bridge member 14, shown in dotted lines connected between the front left and front right uprights 16a, 16b shown in dashed lines. The steering rods 22a, 22b are also shown in dashed lined lines. The narrower track vehicle operates in the same manner as described for the wider tack version shown in FIGS. 2 to 4. However, the narrower track 't' reduces clearance between the chassis portion 2 and the front wheels 4a, 4b, so the maximum lean angle and/or the width of the chassis portion between the wheels can be more limited than with a wider track. The narrow configuration of from wheels shown in FIG. 5 is possible can provide an attractive compromise between vehicle width (for parking and manoeuvring) driver space, tilt angle and maximum passive lateral g. As when in free tilt or passive mode, the tilt angle is determined by the lateral g experienced by the vehicle, reducing the maximum tilt angle reduces the maximum lateral g in passive mode, but higher lateral g can be possible with the intelligent tilt control proposed, or just using tilt bump stops for extreme situations.

Figure 6:
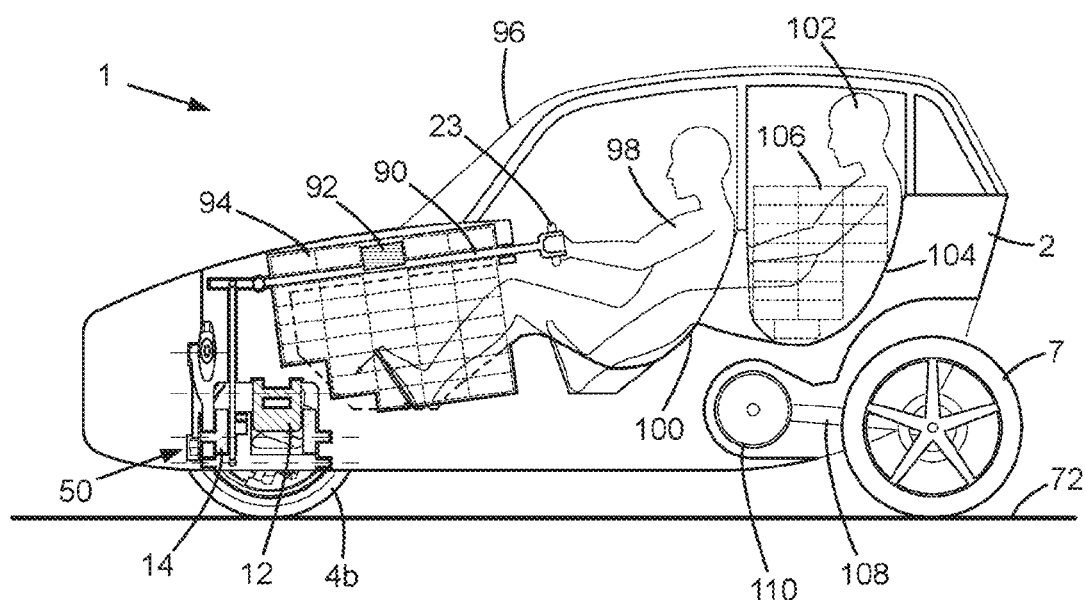
FIG. 6 is a sectional side view of a vehicle according to the present invention.

FIG. 6 shows a sectional side view of another variation or embodiment of the vehicle of the present invention, having two seats. The section is through the longitudinal centre plane of the chassis portion 2, revealing the steering column 90 to which a power steering motor 92 can be connected. A battery pack 94 is shown, that is an array of batteries connected together to form the main power supply for the vehicle. The battery pack 94 can include batteries in a vertical arrangement between the driver's legs, batteries in a horizontal or arched arrangement over the steering column and/or batteries arranged around the side walls of the chassis portion.

The cockpit can be enclosed in any version of the vehicle, whether three or four wheeled and whether one or two-seater. In the two-seater shown in FIG. 6, the cockpit is enclosed by a canopy 96. When some form of canopy is provided, it can be optional to remove the canopy as a whole but this can not only remove a windshield, it also can significantly affect the height of the centre of mass of the body portion and change the dynamics of the vehicle. So more often only a portion of the canopy may be removable. In either case, removing all or a portion of the canopy, it can be preferable to sense whether canopy portions such as side windows have been removed and use such sensor information as inputs to one or more controllers for the vehicle such as for tilt control and/or ESP.

The driver 98 is seated low and central in the driver's seat 100 and the passenger 102 is seated in the passenger seat 104, centrally behind the driver 98 with their legs to either side of the driver. If the passenger 102 is not present, the position of the passenger seat 104 can be utilised for additional batteries as shown in additional battery pack 106. This has the advantages of increased the power that can be stored by the vehicle's batteries to provide an increased range and also to provide effectively a ballast to minimise the effect of changing mass and mass centre of the vehicle when the passenger 102 is not present in the vehicle. For example, the vehicle dynamics can be optimised for two occupants, but for commuting use if a single occupant is present, either a larger range using the additional battery pack is possible, or the dynamic performance may not be as extreme as when both seating positions are occupied. This is because commuting rarely provides many opportunities for fun high performance handling situations. However, when the vehicle is in use on the weekend by two people, the handling is optimised and the fun is maximised. or if only one person goes for a ride or to visit friends or family, the additional battery pack can be used to increase range and practicality for a single person.

The tandem arrangement of two people longitudinally spaced (driver in-front and passenger behind) allows the frontal area of the two-seater vehicle in FIG. 6 to remain similar to that of a single-seater which is very efficient for aerodynamic drag. The two-seater vehicle in FIG. 6 is slightly higher and only very slightly longer than the single-seater vehicle in FIGS. 1 to 5, due to the occupants being sat more upright and the passenger feet to knees passing around the sides of the driver seat. The feet of the driver 98 are lower and behind the bridges 12, 14.

The vehicle of FIG. 6 is also shown as a three-wheeled vehicle, having two front wheels (the front right wheel 4b partially visible) and a single back wheel 7. The front wheels are located in part by the upper and lower members 12, 14, with the tilt control arrangement 50 acting on the lower member 14. The back wheel 7 is shown located by a swing arm 108 like a motorcycle, although other wheel locating geometries are possible. The back suspension can utilise a lay-down spring and damper arrangement as is known to save vertical space, for example the back spring damper can be positioned under the position of the passenger seat 102. The propulsion for the vehicle 1 in this example is by the electric motor 110 at the body end of the swing arm 108, with propulsion being transmitted along or parallel to the swing arm arrangement as with a motorcycle.

Figure 7:
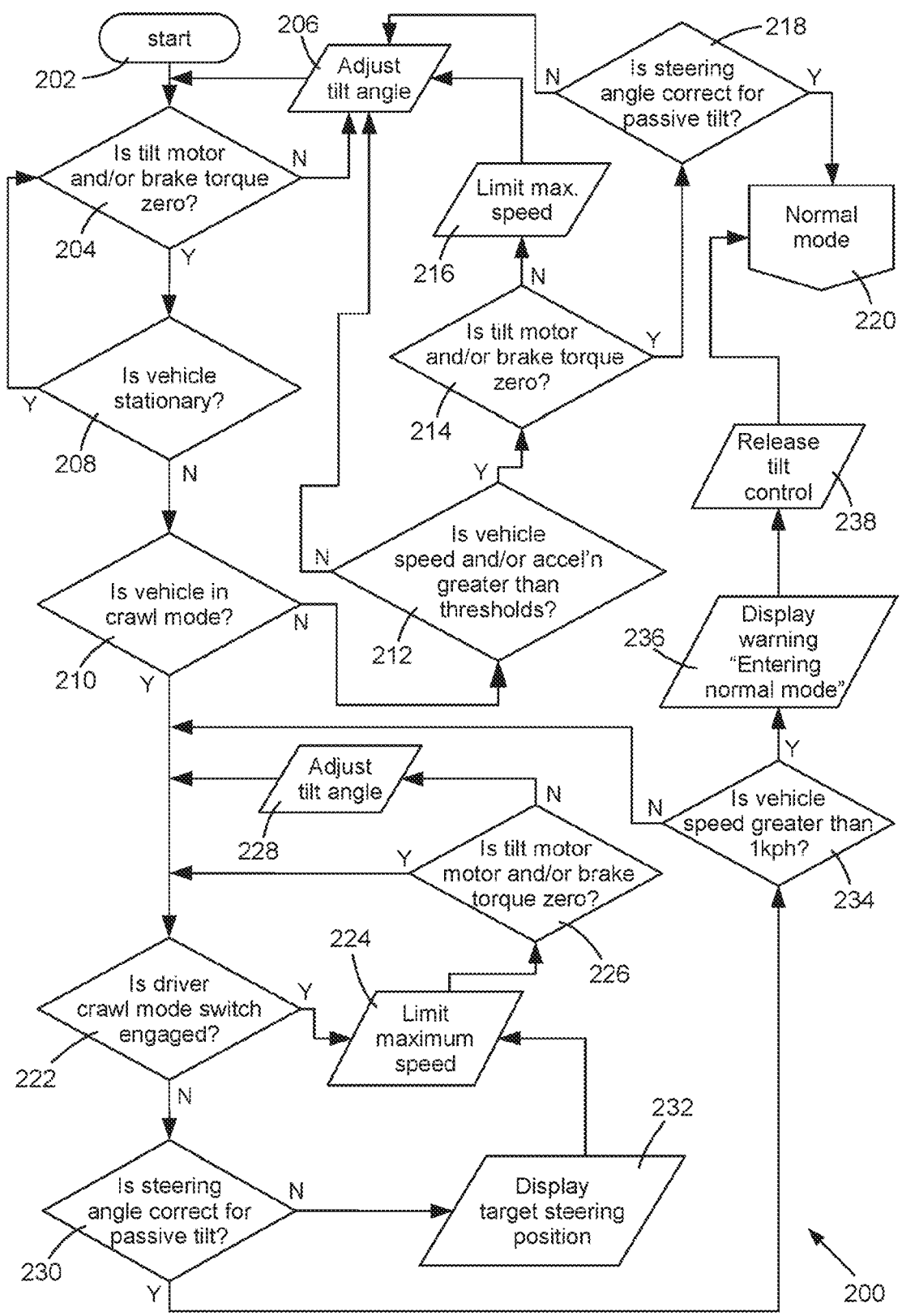
FIG. 7 is a flowchart showing an example of control of transition into normal mode.

FIG. 7 shows a flowchart of a possible control program for the tilt-locked and active modes 200 including controlling the transition into the primarily free tilting or "normal" mode. In the normal mode, while the tilt angle is not locked, it can be damped so the term tilt-unlocked mode is also appropriate for this "normal" mode. At the start 202 of the transition program and tilt-locked mode 200, the controller then tests at 204 whether the tilt motor torque and/or the tilt brake torque (preferably the combination of both) is substantially zero. If it is not, the vehicle will not be in unstable equilibrium as it is relying on the tilt torque for some reason, so the program moves on to the actuation block 206 to adjust the tilt angle. The direction and magnitude of the adjustment 206 can be determined by the magnitude and direction of the tilt motor and/or brake torque. This can continue in a loop from the start 202, through the tilt torque test 204 and tilt angle adjustment 206 back to the start 202 and the tilt torque test until the tilt motor and/or brake torque test 204 is substantially zero. Then the program can proceed to the check of whether the vehicle is stationary 208. If it is, but the control arrangement is active, then the program keeps checking that the tilt motor and/or brake torque test is substantially zero until the stationary vehicle check 208 is negative and the vehicle is in motion. Then the program checks whether the vehicle is in crawl mode 210, i.e. whether the driver has selected crawl mode and is intending on manoeuvring rather than setting off.

Alternatively, if the vehicle is in crawl mode for manoeuvring, it may be preferable to simply lock the tilt angle wherever it is at the time, or simply adjust to parallel to the ground and then lock the tilt angle, or even set the tilt angle to the unstable equilibrium position, then lock it and keep the tilt angle locked for the remainder of the time that crawl mode is engaged.

If the vehicle is not in crawl mode at the crawl mode check 210, then the program tests whether the vehicle speed and/or vehicle acceleration are greater than pre-set thresholds in step 212. If the vehicle is not travelling fast enough to be stable in normal mode without tilt motor and/or tilt brake control and not accelerating to such a speed at 212, then the program can return to the start 202, or check and adjust the tilt angle 206 on the way to the start 202. However, is the vehicle does have sufficient speed and/or acceleration to operate in normal mode, the tilt motor and/or tilt brake torque need to be checked 214 to ensure the vehicle is in the unstable equilibrium position.

If that tilt motor or brake torque check 214 for unstable equilibrium is negative, the maximum speed of the vehicle needs to be limited to prevent the driver accelerating to a maximum speed 216 while still in tilt locked mode. The maximum speed in 216 is low enough to enable safe transition into free tilt or normal mode after the vehicle is in unstable equilibrium and once other tests are satisfied. So with the maximum speed limited, the tilt angle is adjusted 206 towards the unstable equilibrium position and the program returns to the start 202. However, if the unstable equilibrium check 214 is positive, the program proceeds to check whether the steering angle is correct for the passive tilt operation at 218. If this steering angle check 218 is negative, the program preferably provides an indication to the driver of what is required from the steering angle to proceed into normal operation and in the meantime, the program returns to the start. If the steering angle check 218 is positive, the program allows the controller to enter free tilt or "normal" mode 220. The tilt control provided by the tilt motor and tilt brake can be released as the program enters normal mode and the driver can be warned as shown below.

If the controller provides a continual display to the driver of the ideal steering position versus the actual steering angle, all of the above steps can be passed extremely quickly as the vehicle takes off and the maximum speed limitation may not be reached before the vehicle has entered normal mode. The minimum speed required for operation in unstable equilibrium (as tested for in 212) is very low and may be as little as one kilometre per hour or even a little less. However, the maximum speed 216 at which a transition into normal mode can safely take place can be much more variable. If the control is conservative, then the maximum speed can be as low as ten kilometres per hour or less, but with an experienced driver, it could be at least twenty kilometres per hour.

If at the crawl mode check 210 the vehicle is in crawl mode, either through driver selection or entering automatically when slowing or for other possible reasons, the program proceeds to check whether the driver has selected the crawl mode, i.e. is the crawl mode switch engaged 222. If it is, then the driver is intending to manoeuvre at least initially, so the program limits the maximum speed 224. Also this test can check whether another flag has been set due to another condition that requires the vehicle to enter safe mode, that flag being set and removed separate to this program. An example of such a flag can be low power availability (i.e. low fuel or low battery) from detection of a failure of a component or system of the vehicle that requires a "limp home" mode.

The program then continues to check whether the tilt motor and/or brake torque is zero 226 and if not adjust the tilt angle 228 to adjust the vehicle towards an unstable equilibrium position looping around 222, 224, 226 and 228 when required, until the crawl mode switch test 222 is negative. This type of crawl mode can be referred to as a continuously tilt monitoring and tilt-adjusting crawl mode.

Alternatively, once in crawl mode and the program has checked whether the crawl mode switch is engaged at 222, if yes, the program still limits maximum speed 224, but rather than checking tilt motor and/or brake torque is zero 226 and adjusting the tilt angle 228 if required, the program can lock the tilt angle or return the tilt angle to zero, then lock the tilt angle by applying the tilt brake. This becomes a tilt-locked or fixed tilt angle mode, most useful for low speed manoeuvring, while parking for example, and/or to save power by avoiding unnecessary tilt adjustments while crawling along in traffic queues. Such a tilt-locked or fixed tilt angle mode can be available switched separately to the continuously tilt monitoring and tilt-adjusting crawl mode immediately above. However, the crawl mode can primarily comprise this tilt-locked or fixed tilt angle mode. Then once the crawl switch is no longer engaged at 222, i.e. the driver releases the crawl mode switch, then the program can adjust the tilt angle to the unstable equilibrium position where the tilt motor and/or tilt brake torque is substantially zero. This is done as above, and as shown in FIG. 7 by following the loop of limiting maximum speed 224, checking tilt motor and/or brake torque 226 and adjusting tilt angle 228 if necessary, but now as the crawl mode switch is no longer engaged, the steering angle is checked as being correct for passive tilt 230 as a check that the actual tilt angle has been matched to the required tilt angle before proceeding to check vehicle speed 234 which is no longer limited.

However, returning the program steps shown in FIG. 7, when the crawl mode switch is released at 222, as the program has just ensured that the vehicle is in the unstable equilibrium position, it then proceeds to check that the steering angle is correct for passive tilt operation 230. If not, the program displays the target steering position 232 to enable the driver to see what is preventing entry into normal mode and how to fix it, or to enable the program to adjust the tilt angle to the required unstable equilibrium position, the two converging with every loop through 230, 232, 224, 226, 228 and 222. However, if the steering angle is correct for passive tilt operation in the normal mode, after a check that the vehicle speed is greater than a threshold 234 such as one kilometre per hour, a warning is displayed 236 (and/or other indication made by the controller), the tilt control is released 238 and the primarily free-tilt, passive, normal mode 220 is entered. The warning may be to display text such as "Entering normal mode", but other visual and/or audible and/or tactile indications may be triggered or made by the program for the benefit of the driver.

Figure 8:
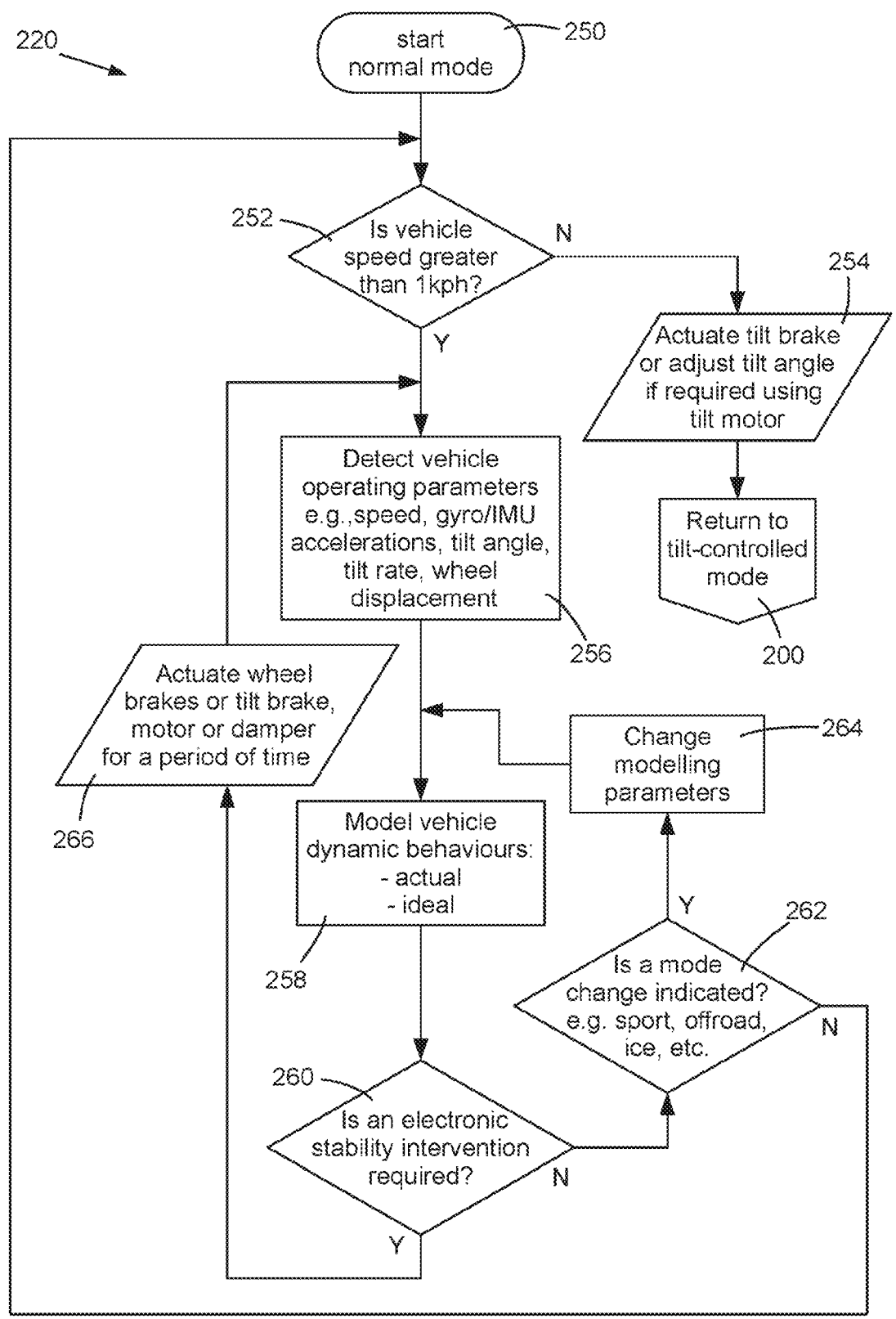
FIG. 8 is a flowchart showing an example of control in the normal mode.

Entry to normal mode 220 is shown in FIG. 8 and begins with the start of normal mode 250. The vehicle speed is checked 252 and if less than a threshold such as one kilometre per hour, the program controls the tilt angle 254 by driving the tilt motor or applying the tilt brake and returns to the transition program and tilt controlled mode 200 to enable re-entry to normal mode when safe. However, if the vehicle speed when checked 252 is greater than the threshold, vehicle operating parameters are detected 256 such as vehicle speed and/or wheel speeds, orientation using a gyroscopic sensor or Inertial Measurement Unit (IMU) data such as linear and rotational accelerations. Also the tilt angle, tilt rate and wheel displacements (spring compressions) and other parameters can be sensed as discussed below. These parameters allow the vehicle dynamic behaviours to be modelled 258 and actual behaviour can be compared to an ideal or preferred behaviour to decide whether an electronic stability program (ESP) intervention is required 260.

If no ESP intervention is required, the program can assess whether a mode change is indicated 262, such as a sport or off-road mode, which can allow control system parameters to be modified, thresholds and/or algorithms changed to better suit the sensed and modelled operation of the vehicle. If such a change of operational or modelling parameters 264 is required then remodels the dynamic behaviour of the vehicle 258 using the new parameters or algorithms. Alternatively, if an ESP intervention is required when checked at 260, the program proceeds to actuate tilt control devices such as the tilt motor, tilt brake and/or tilt damper and wheel brakes 266 as required. Even the steering angle may be controlled if required. The actuation of any or all of the tilt brake, tilt motor or tilt damper and/or the wheel brakes, and even propulsion motor torque control or steering angle is only for a period of time, then the program proceeds to detect the vehicle operating parameters 256 once again, models the dynamic behaviours of the vehicle 258 and if not ESP is required and no change of mode is indicated, then the program returns to the start of normal mode.

When the tilt angle of the vehicle needs to be controlled by the ESP, this can be achieved through multiple pulses of say tilt motor control so that the vehicle does not switch into a tilt-locked mode at high speed. This can avoid the problems of transitioning from tilt locked mode to tilt unlocked mode at high speed. Such a pulsed control where the tilt angle is driven for very short periods, can be particularly beneficial when correcting for sudden changes in cross wind such as when passing a truck. Therefore, the period of time that the devices such as the tilt brake, tilt motor or tilt damper is applied for is preferably momentary or temporary, with minimisation of the time being important in avoiding issues of the driver becoming confused between steering and counter-steering. Hence the proposed possible use of pulsing the operation of such devices can make such operation unobtrusive. The period of operation can be less than 2 seconds which can allow the tilt angle to be fully adjusted for a strong cross-wind without harsh tilt accelerations, but is preferably less than 1 second and more preferably less than 0.5 seconds which can give the driver sufficient feedback to begin to respond to the input as required while reducing the effects of the input by reducing the magnitude of unwanted tilt angle and path changes. The devices can be actuated using a number of pulses during the period of time to further reduce the noticeable intrusion into the driver's control of the vehicle. The aim of the control system being to maintain passive driver-actuated counter-steering operation for the largest possible percentage of time when operating at speed.

Figure 9:
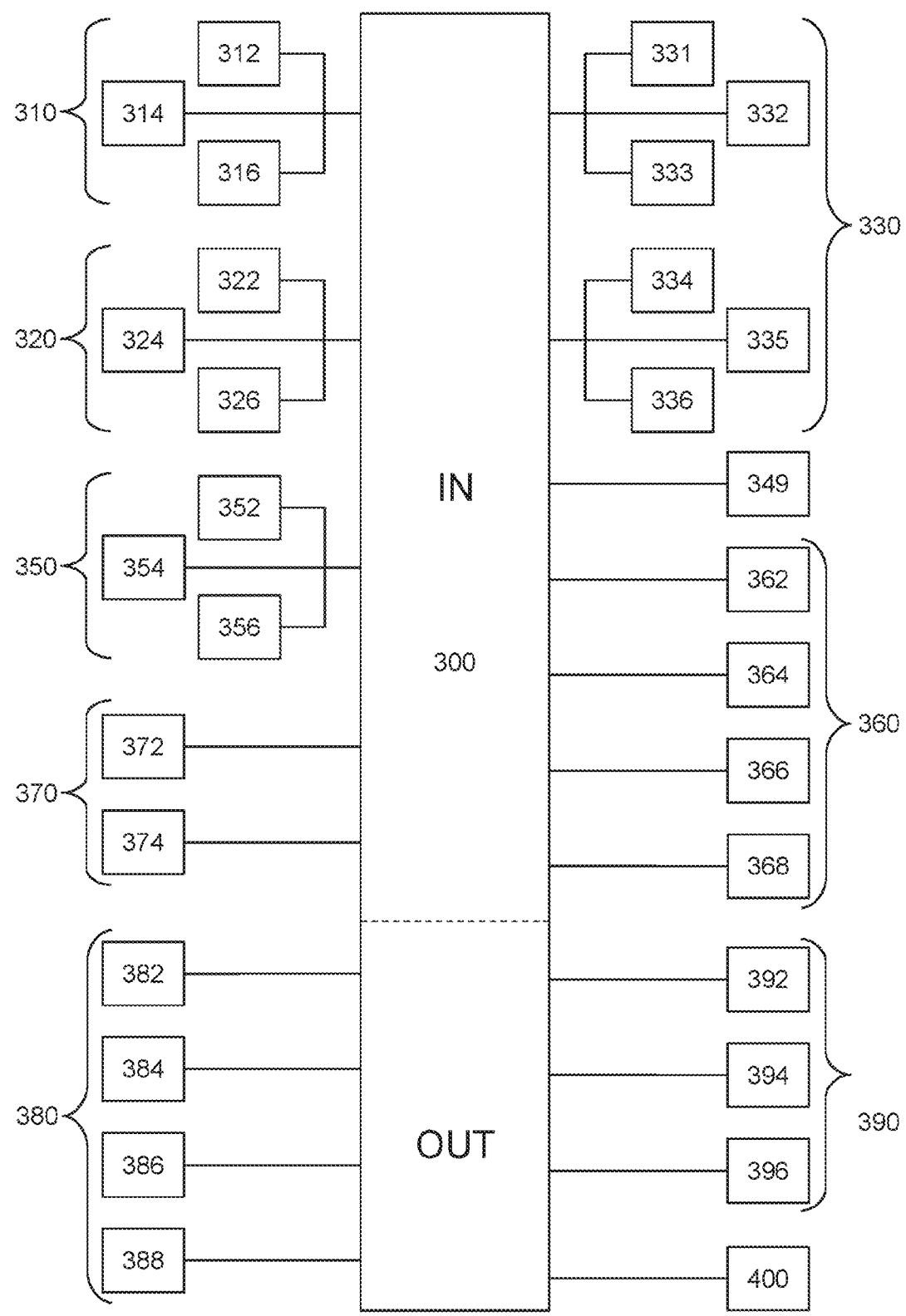
FIG. 9 is a schematic diagram of an example control arrangement according to the present invention.

FIG. 9 schematically shows the electronic control unit (ECU) 300 of the tilt control arrangement and an example of the inputs and outputs of the tilt control arrangement to provide the above discussed tilt control functionality. For example, wheel speed sensors 310 can be a single wheel speed sensor and/or a GPS speed input. Preferably, for a three-wheeled vehicle such as those shown in FIGS. 2 to 6, the wheel speed sensors 310 include a rotational speed sensor for each wheel, such as the front left wheel speed sensor 312, front right wheel speed sensor 314 and the back wheel speed sensor 316. Vehicle speed is required for the tilt control, but if the speed of all wheels are sensed, Alternatively, at least the front left wheel speed sensor 312 and front right wheel speed sensor 314 are sensed and the yaw acceleration is known, a safe-path-following (trajectory, yaw controlling) type ESP can be provided.

Individual wheel displacement sensors 320 can be provided to assist with the dynamic modelling of the vehicle behaviour. Again a three-wheeled example is shown, having a front left wheel displacement sensor 322 and front right wheel displacement sensor 324 which each detect displacement of the respective wheel relative to the at least one member such as a bridge. The back wheel displacement sensor 326 can monitor the rotation of the swing arm for example if the motorcycle-like geometry from FIG. 6 is used. Such displacements can indicate wheel loads as they are effectively a measure of the suspension spring compression.

While accelerations can be measured at any point on the vehicle, the use of an Inertial Measurement Unit (IMU) 330 can provide many of the useful signals such as roll, pitch and yaw acceleration signals 331, 332, 333 and outputs of linear longitudinal, lateral and vertical accelerations 334, 335, 336. An IMU can also provide other useful outputs such as absolute orientation through roll, pitch and yaw angles relative to ground. While the IMU 330 or similar sensor inputs can enable true upright to the identified, the wheel or suspension forces (from the wheel displacement sensors 320) and tilt sensors 350 can provide a redundancy in the modelling calculations or verify the modelling used by the ECU 300 as part of the control process. In the two-seater versions of the vehicle, the passenger seat can include a passenger seat sensor 349 to indicate at least the presence of a passenger or of an additional battery ballast, or can provide a weight in the passenger location to provide for mode accurate modelling of the mass and its centre.

Vehicle tilt sensors 350 can be provided to output tilt rotation and torque data of the chassis portion relative to the at least one member of the suspension arrangement such as for example the lower bridge. Shown are a tilt displacement sensor 352, tilt acceleration sensor 354, tilt motor torque sensor 356 and tilt brake torque sensor 358. The tilt motor and brake torque sensors 356, 358 may be combined as a single sensor, for example of the shaft torsion of the shaft connecting the tilt control disc (acted on by both tilt motor and brake) to the lower bridge. Alternatively or additionally, the damping force provided by the tilt damper can be measured or sensed.

As discussed above, a number of driver inputs 360 can be provided, such as an operational mode selector 362 to select between crawl mode, normal mode or limited mode control programs for example. Also paddles can be used by the driver to tilt the vehicle manually or to assist in pre-empting extreme manoeuvres. The inputs can be a left paddle sensor 364, a right paddle sensor 366 and a both paddles sensor 368 although two of these can be combined with many constructions of paddle such as one rocking paddle in place of two individual paddles. For example, the paddles can be a single beam pivoted on the steering wheel to rock on the steering wheel. The paddle can be pulled toward the driver on the left to tilt the chassis portion to the left and similarly the paddle can be pulled toward the driver on the right to tilt the chassis portion to the right. If both the left and right ends of the paddle are pulled towards the driver or pushed away from the driver, alternative functions can be indicated, for example pulling both paddles to towards the driver can (at least below a threshold speed) activate the tilt brake and pushing both ends of the paddle away from the driver until it locks or clicks past a detent can engage crawl mode. These are just examples and many variations and possible permutations of functions can be used as should be obvious to one skilled in the art.

Finally in the input section, steering sensors 370 are shown including a steering angle sensor 372 which can be used to derive steering rate, or a steering rate sensor 374 or signal can be provided.

In the output section, there are multiple tilt control devices 380 including the tilt motor 382, tilt brake 384, a tilt lock or unlock 386 which can be to control a tilt locking pin to lock the chassis portion in a tilt position for when the vehicle is not in use. Also the tilt control arrangement can control the tilt damper 388.

Information indicators 390 are shown, including a mode display to confirm the current operating mode and/or the currently selected operating mode (which may not be the mode currently engaged if control criteria are not met). Also the information indicators preferably include at least a warning display 394 for conveying warning messages or advice to the driver and preferably a warning audible alarm 396. For example, when holding the control locked in crawl mode using the paddle(s) the warning display 394 can be triggered to flash or otherwise highlight that the vehicle is in crawl mode. Similarly when the steering angle in crawl (tilt locked) mode is not matched to the steering angle required to transition to normal (free tilt) mode, the warning display 394 can indicate that fact and preferably also indicate required steering angle versus current steering angle or at least in which direction the steering angle needs to be moved to enable transition into normal mode. Also if the ECU controls the steering angle, the warning display 394 can warn that the steering is being adjusted.

The inputs can allow various ESP functions, and the prevention of topple over or high-sider events (out of control tilt motions) can be done with activation of some or all of the tilt control devices 380. However, to provide a more complete solution and enable safe-path-following type ESP, one or more wheel brakes 400 can be activated or modulated and the motor power controlled at least in part by the ECU 300. Similarly other sensors such as brake and throttle (or acceleration, coast and brake for example) can be provided. When in the crawl mode the throttle may be a different input or have different response.

There can be other inputs and outputs. For example, if the tilt brake can be manually operated (such as for emergencies), a sensor for the manual lever operated by the driver can be provided so at least the control arrangement can detect a reason for the tilt behaviour being modified. The tilt brake can be operated manually by the driver and automatically by the tilt controller 300. Indeed the park brake can be linked or actuated at the same time as the tilt lock. Cameras, radar or other sensors can be provided for lane keeping, blind spot warnings, front or rear cross-traffic, distance sensing cruise control, emergency brake assist, ground sensing and other well-known functions. The passenger seat position can be sensed for an occupant or similar ballast. A temperature sensor to warn of the possibility of ice can also be used by the ECU 300 to modify thresholds for safety.

A learning mode can be provided by the ECU in which the driver inputs can cause the chassis portion to tilt in appropriately, but only up to a limited amount from the modelled unstable equilibrium position while the vehicle speed is limited, maybe increasing by levels until the driver has mastered the control of the free-tilting operation of the vehicle in normal mode. The vehicle can include a biometric security system which can, with the approval of the owner, grant a new user firstly a basic learning mode, working up to authentication for full passive free tilt functionality based on competence as assessed by the ECU.

Figure 10:
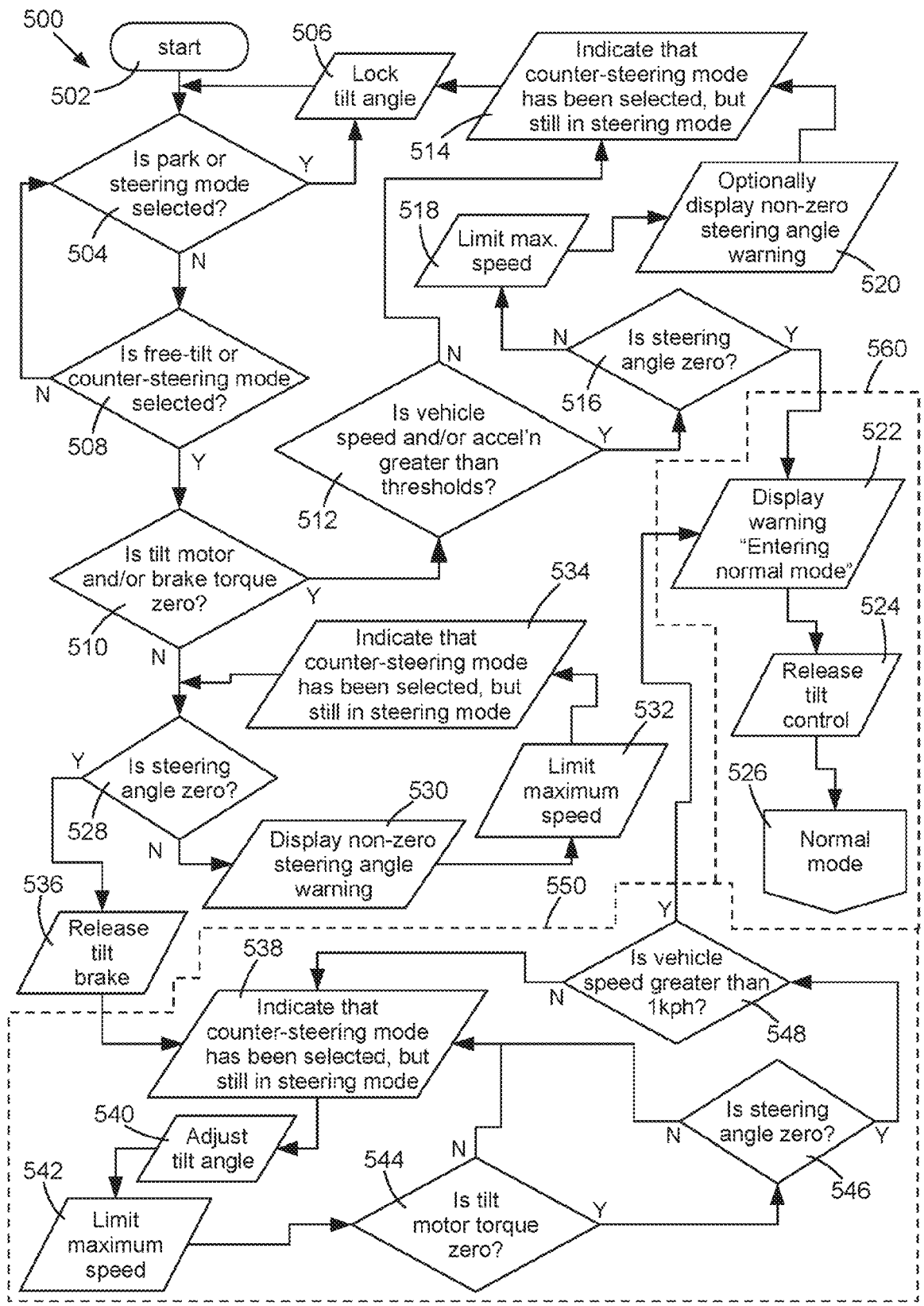
FIG. 10 is a flowchart showing an alternative example of control of transition into normal mode.

The ability to provide a learning mode for how the transition from controlled tilt to free tilt or normal mode operates can improve ease of operation for a driver. FIG. 10 shows a flowchart of an alternative program for the transition. Providing an alternative program for the transition can also provide an alternative feel or type of operation for the driver. This can be as a selectable alternative to the tilt-locked and active modes 200 program in FIG. 7 or as the main program replacing the control program for the tilt-locked and active modes 200 including controlling the transition into the primarily free tilting or "normal" mode. The main difference in operation between the program in FIG. 7 and the program in FIG. 10 is that in FIG. 7, the transition from active, tilt controlled mode into passive, free tilt normal mode can occur regardless of whether travelling in a straight line or cornering, whereas the transition in FIG. 10 can only occur when travelling in a straight line or with zero steering angle.

In the program for the tilt-locked and active modes 500 shown in the flowchart of FIG. 10, at the start 502 a check is made of whether the vehicle is in a locked-tilt mode of operation at 504. This may be a default starting mode of operation, but can also be optionally be selected by the driver. For example, is the vehicle drive system in park, reverse or has the "steering" mode of the tilt control arrangement being selected. As discussed above, the steering mode is a tilt locked or tilt-controlled state, as opposed to a free-tilt state. If park, reverse or steering mode has been selected at 504, then the program ensures that the tilt angle is locked at 506, such as by ensuring that the tilt brake is applied.

If the test at 504 is negative, then it could be assumed free-tilt or counter-steering mode is intended or it can be physically selected. While this could happen by default, preferably the driver indicates a wish to change to free-tilt or counter-steering mode, which is also referred to in this specification as the normal mode. This can be through the use of a button by which the normal mode can be used to pre-select counter-steering mode without simply stopping tilt control. If the counter-steering mode has been selected at 508 then the program can proceed to check whether it is safe to enter the normal or free-tilt, counter-steering mode. This is done by checking to ensure that there is no tilt-correcting torque being applied by the tilt motor and/or by the tilt brake at 510. If the tilt correcting torque from the tilt brake is substantially zero, and the tilt brake is applied, then by definition, the vehicle must be in the unstable equilibrium position. If that is the case, but the vehicle is not moving at sufficient speed or with sufficient acceleration to provide sufficient speed for passive free-tilt operation in normal mode, as checked at 512, then the program indicates to the driver at 514 that counter-steering (or normal) mode has been selected, but the vehicle is still operating in steering mode. This can be by simply flashing a light in the button used to pre-select counter-steering mode, or by any other visual, audible and/or tactile means. The program then ensures that the tilt angle of the vehicle is still locked at 506 and returns to the start.

However, if when the vehicle speed and/or acceleration is checked at 512 and found to be sufficient, the steering angle can then be checked to ensure that it is substantially zero. If not, then the vehicle is not safe to transition into the passive free-tilting normal mode, so the vehicle speed is limited 518 and preferably a indication is made to the driver at 520 that the steering angle is non-zero, to help the driver understand why the vehicle has not transitioned into the selected normal mode. Then the program indicates counter-steering mode has been selected by is still in steering mode at 514 and ensures the tilt angle is locked at 506 before returning to the start 502.

If, at 516, the steering angle is substantially zero, the tolerance of which can vary with speed, then the conditions have been met for entry into normal mode, so the program can proceed to the exiting towards normal mode portion 560, indicated by a dashed outline in FIG. 10. The program displays or otherwise indicates visually, audibly and/or by a tactile response at 522, the that program is entering the passive, free-tilting normal mode. The tilt control such as the tilt brake can then be released at 524 and normal mode can be entered at 526. The normal mode can be the normal mode 250 of FIG. 8 or any other free-tilt mode including an entirely passive mode with no safety checks or interventions. However, to avoid the vehicle toppling over, it is preferable to use a normal mode such as that outlined in FIG. 8 and described above.

If at 510 the tilt motor and/or tilt brake torque is not zero, indicating that a tilt angle correction needs to be made, the program can check at 528 if the steering angle is zero. If the steering angle is not zero then a non-zero steering angle warning 530 can be displayed, the maximum speed of the vehicle limited at 532 and the program indicate at 534 that counter-steering mode has been pre-selected, but that the steering mode of a controlled tilt mode of operation is still current. However, if the steering angle is substantially zero when checked at 528, then the tilt brake can be released to allow active tilt angle adjustment. The program can then proceed into an active tilt adjust portion 550 of the program, outlined by a dashed line in FIG. 10.

As the driver has pre-selected counter-steering or normal mode, but the program has not yet been able to safely progress into normal mode, this is indicated at 538 before adjusting the tilt angle 540 using the tilt motor for example. As normal mode is not operational, i.e. pre-transition, it is safer to limit the maximum speed 542 of the vehicle, both to avoid risks of automatic or semi-automatic transitions from steering to counter-steering at high speeds and to encourage the driver to help put the vehicle in a state to enter the normal mode as soon as possible. Then with the tilt angle having been adjusted, the tilt motor torque can be assessed at 544 to see whether it is around the zero of a unstable equilibrium position of the vehicle. If the tilt motor torque is not zero, the tilt adjust portion of the program loops back to indicating that the counter-steering or normal mode has been selected, but the control is still in the steering mode. However, if the tilt motor torque is substantially zero, the program checks whether the steering angle is also substantially zero at 546.

If the steering angle is not zero, then the program loops back to indicating that the passive, counter-steering or normal mode has been selected, but the control is still in the active or steering mode. if the steering angle is substantially zero, the program then checks at 548 whether vehicle speed is greater than a minimum threshold, such as 1, 2 or 3 kph. If not, it again loops back to indicating that the passive, counter-steering or normal mode has been selected, but the control is still in the active or steering mode. However, if the vehicle speed when checked at 548 is sufficient, the program can proceed towards the entering normal mode portion 560 of the program. As described above, the exit towards normal mode portion 560 of the program proceeds by providing a visual, audible and/or tactile warning 522 that the control is entering the passive normal mode of operation, releasing the tilt control at 524 and then entering normal mode at 526.

Figure 11:
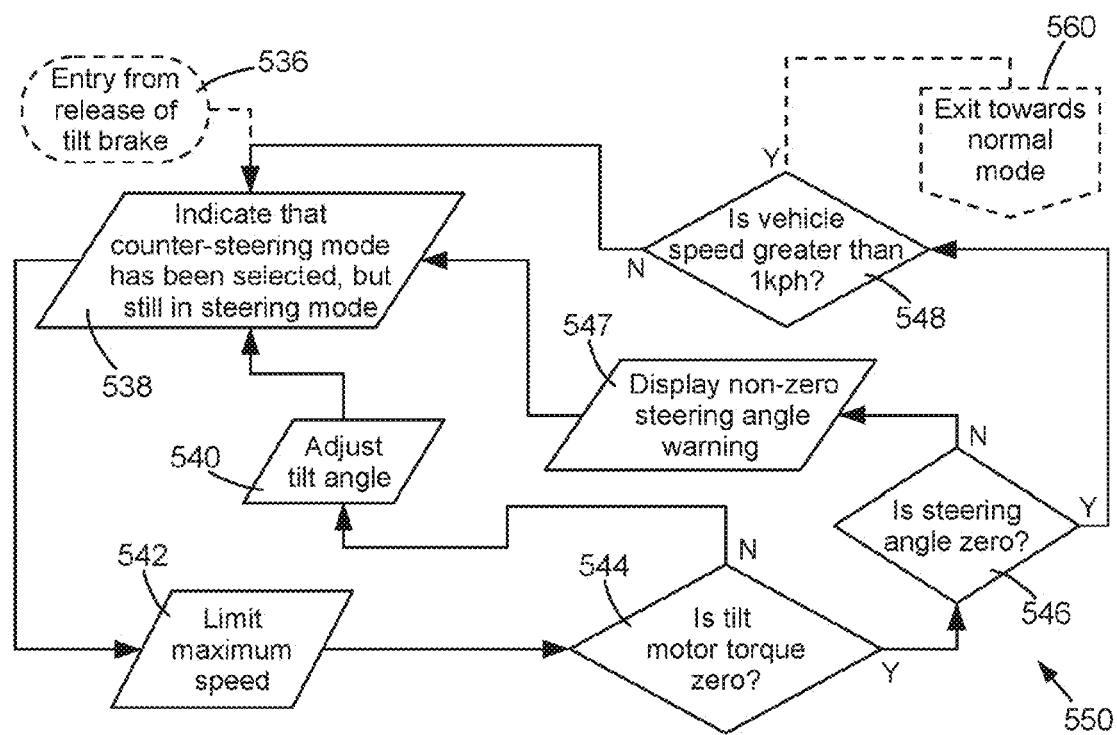
FIG. 11 shows a flowchart of a first possible active tilt adjust portion of the control of FIG. 10.

FIG. 11 shows the active tilt adjust portion 550 of the program of FIG. 10, but with the addition of an indication of non-zero steering angle at 547 to warn the driver that the steering angle is preventing the transition into normal mode. As previously, such a warning indication can be audible and/or visual and/or tactile. Also the order of parts of the tilt angle adjust loop have been changed, so the maximum speed is limited at 542, before the check for zero tilt motor torque is made at 544, in which the tilt motor torque can be measured to determine the magnitude of any required adjustment. Then if a tilt angle or tilt force adjustment is required, such an adjustment can be made at 540 before restarting the loop with indicating at 538 that the vehicle is still in steering mode.

Figure 12:
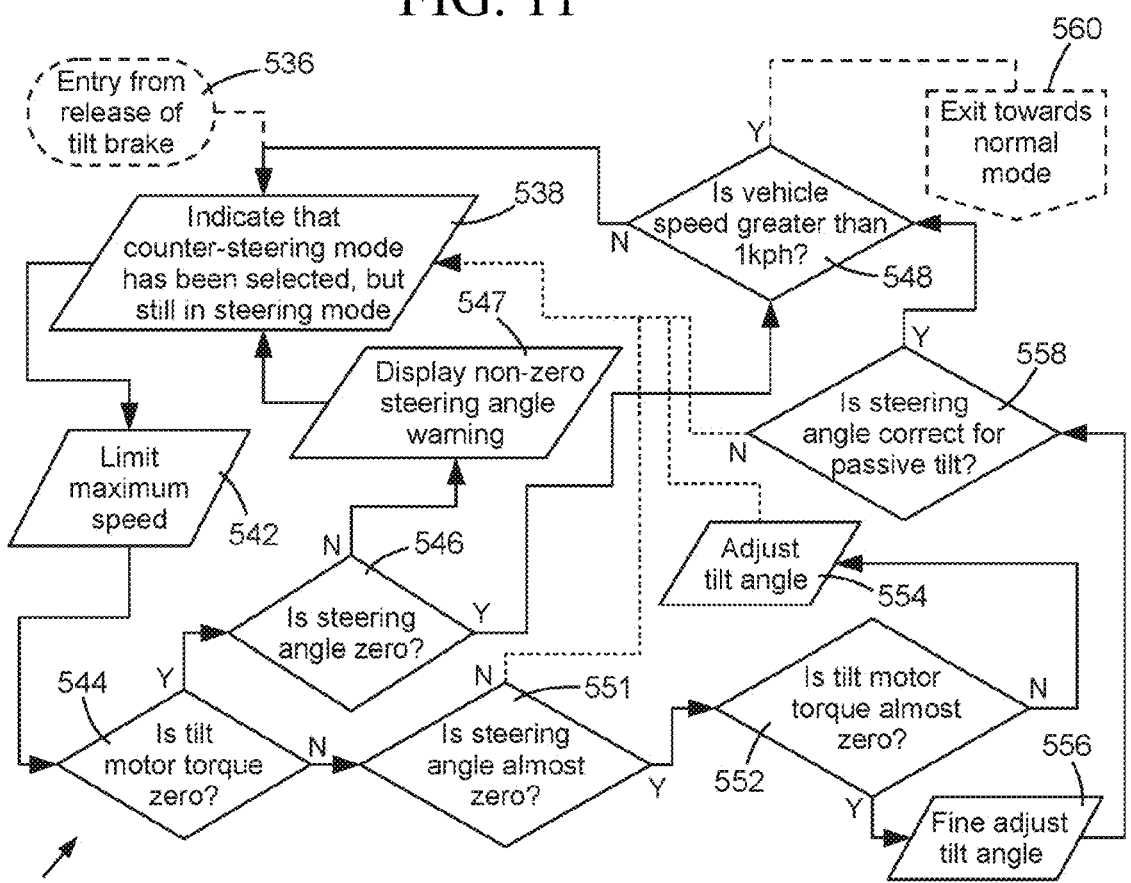
FIG. 12 shows a flowchart of a second possible active tilt adjust portion of the control of FIG. 10.

FIG. 12 shows a further modification to the active tilt portion 550 of the program in which, when the steering angle is low, the program can still transition from active, tilt-adjusting, tilt controlled or steering mode into the passive free-tilt counter-steering mode. This transition could also be permitted when the lateral acceleration is low or the lean angle is less than a predefined maximum and the program of FIG. 12 could be modified to suit these alternatives, or a combination of steering angle, lateral acceleration, lean angle, tilt motor torque and/or the loads on laterally spaced wheels. The program of FIG. 12 is the same as the program of FIG. 11 until the check 544 whether the tilt motor torque is zero. If the tilt motor torque is zero (within a tight tolerance) then the program proceeds as before to check the steering angle is substantially zero at 546, with the same resulting actions of warning 547 or speed check 548. However, if when checked at 544 the tilt motor torque is not zero, an evaluation of the magnitude of the steering angle is made at 551. If the steering angle is not almost zero, then the program loops back (shown in dashed lines because they visually cross other flow lines) to restart the active adjustment loop by returning to indicate at 538 that the vehicle is still in steering mode although countersteering mode has been selected. However, if the steering angle is almost zero, so within a loose tolerance of for example 2 degrees, 1.5 degrees, 1 degree or 0.5 degrees, then an evaluation of the magnitude of the tilt motor torque is made at 552.

If at 552, the tilt motor torque is not almost zero, then the tilt angle is adjusted at 554 before returning (shown in dashed lines because they visually cross other flow lines) to 538 to restart the active adjustment loop. If at 552 the tilt motor torque is almost zero, so within a loose tolerance, then the program could proceed directly to check that the steering angle is correct for passive tilt at 558, within a tolerance. However, in FIG. 12, instead of proceeding directly to check steering angle, a fine adjustment of the tilt angle or tilt force is made at 556. Then a check can be made at 558 of whether the steering angle is correct for passive tilt operation of the vehicle. If the steering angle check is negative, the program returns (shown in dashed lines because they visually cross other flow lines) to 538 to restart the active adjustment loop. Conversely, if the steering angle check is positive, the speed and/or acceleration of the vehicle is checked at 548 before either exiting toward normal mode 560 or restarting the active adjustment loop by returning to indicate at 538 that the vehicle is still in steering mode although countersteering mode has been selected.

In the test of whether the tilt motor torque is almost zero, the above-mentioned loose tolerance can be varied with speed and/or with steering angle. For example, if the vehicle steering is at full lock a transition is likely to be undesirable and difficult to manage successfully. So at full lock the loose tolerance can in fact be very small or zero percent and effectively prevent the program from following the fine adjustment path out towards normal mode. Indeed at steering angles above one third of full lock or half of full lock, the loose tolerance can be negated by being set at zero percent. Then as steering angles reduce towards zero, the loose tolerance can be increased from zero percent to one hundred percent of the full allowable loose tolerance of tilt motor torque, which can for example be equivalent to the torque required to react a cross wind of 50 kph.

Similarly, a predicted change of tilt angle required to negate the tilt motor torque and achieve unstable equilibrium can be used in place of the loose tolerance on the torque itself. The transition into active mode could be made increasingly quick as the predicted change of tilt angle nears zero, so can be when the predicted change is tilt angle is less than 1 degree, preferably less than 0.5 degrees or more preferably less than 0.2 degrees. The allowable magnitude of the change of tilt angle for proceeding towards fine tilt angle or force adjustment and normal mode can be graduated in dependence on other factors such as the steering angle, to again make it progressively more difficult and less likely that the program can transition into the passive, free-tilting normal mode at significant steering angles.

In any of the programs of FIG. 7, 10, 11 or 12, if the vehicle speed is too low, that too can be indicated to the driver, so that the characteristic of operation preventing entry into normal mode is clear to the driver.

The invention as described herein avoids the problems of existing free-tilt type vehicles which make it very difficult for the driver to transition from steer to countersteer (or from locked tilt mode into unlocked tilt mode or free tilt mode). The first mode aims to put the vehicle in substantially the correct unstable equilibrium (or force neutral) position before accelerating from standstill (and/or from low speeds), thereby ensuring that the driver is not required to make a strong corrective countersteer movement immediately when tilt lock is released and the vehicle becomes free or able to tilt. Such a corrective move is very difficult, as at standstill (or low speeds) there is no gyroscopic force in the wheels and large steering motions are required to produce effective change in the lateral position of the effective tyre contact patch relative to the centre of mass of the body, making catching the vehicle from "falling over" extremely difficult or impossible in vehicles where the driver cannot put their feet to the ground to stabilise and tilt the body. In mode 1 this problem is avoided by adjusting the tilt of the body to the unstable equilibrium position even when on uneven ground or with a side wind, pretty much in line with what the driver does with his feet down on a bicycle.

Another possible variation to the programs described or possible feature to include in any similar program according to the present invention, is the feature that, if the vehicle comes to a stop mid-corner, i.e. if the steering has not been placed straight ahead and if the tilt angle is held at the last passive tilt angle (which would be a small tilt angle due to the low speed) prior to normal (free-tilting) mode being suspended due to excessively low speed, then the program does not attempt to bring the chassis portion upright or into a force neutral, or unstable equilibrium position. Instead, the program can, when exiting the normal mode, go into a suspend type mode where the tilt angle of the vehicle is maintained while the driver maintains the steering angle with e brake on. Once the vehicle starts to move, if the steering angle has not significantly altered, then the program con continue to hold the tilt angle until the combination of speed, steering and tilt reach or become near the unstable equilibrium position. Then the transition to normal mode can begin.

Modifications and variations as would be apparent to a skilled addressee are deemed to be within the scope of the present invention. For example, if the rear wheel or wheels are the steered wheels, rather than the front wheels, the vehicle would be a "steerer" at all times, whether tilt locked or free to tilt. This does not change the general approach described herein, whereby the steering tilt angle must be correct at the time of transition from tilt-locked mode to tilt-unlocked mode or free tilt mode. A steerer type operation with the back wheel(s) being the steered wheels can be preferable where the target market of drivers are car drivers but not motorcyclists.

The two laterally spaced wheels towards one end of the vehicle can be located by any wheel geometry. For example, the at least one member does not need to include a bridge member between the two laterally spaced wheels. Instead, each wheel can use a more conventional wheel locating geometry such as double wishbones, a McPherson strut or any other known wheel locating geometry. The resilient supports in such a case can be interconnected to provide switchable roll stiffness, such as using a respective air spring to resiliently support the body above each respective laterally spaced wheel, then interconnecting the sir springs with a conduit that can be selectively blocked. When the conduit is blocked the arrangement has a roll stiffness from the air springs and when the conduit is not blocked the arrangement has zero roll stiffness from the air springs. Other equivalent possible arrangements are known, such as using similar interconnections of hydro-pneumatic rams are possible.

The invention claimed is:

1. A vehicle having a chassis portion, a first suspension arrangement towards a first end of the vehicle and a second suspension arrangement towards an opposite end of the vehicle;

the first suspension arrangement including a first left wheel laterally spaced from a first right wheel, each first wheel being connected to the chassis portion by at least one member such that the chassis portion can tilt;

a tilt control arrangement including at least a tilt controller, a tilt motor and a tilt brake, the tilt motor and tilt brake each being operable to selectively apply a force or torque between the chassis portion and the at least one member of the first suspension arrangement; wherein the tilt controller has in use at least a first mode and a second mode, in the first mode of the tilt controller, the tilt control arrangement controls a tilt angle of the chassis portion using the tilt motor and/or the tilt brake, in the second mode of the tilt controller, the vehicle has a positive forward velocity or speed and the tilt controller does not control the tilt angle of the chassis portion for at least fifty percent of time the vehicle is operating with the tilt controller in the second mode;

the tilt controller operating in the first mode when the vehicle is stationary or before the vehicle accelerates above a first minimum speed;

when the tilt controller is operating in the first mode and the tilt motor is in use, the tilt motor adjusts the tilt angle of the chassis towards an unstable equilibrium position;

the tilt controller selectively permitting a transition between the first mode and the second mode in dependence on at least one operating parameter of the vehicle;

when the transition is from the first mode to the second mode, the at least one operating parameter includes vehicle speed and a signal indicative of an equilibrium state of the chassis portion, the controller selectively transitioning into the second mode when:

the vehicle speed is greater than the first minimum speed; and/or the signal indicative of an equilibrium state of the chassis portion indicates unstable equilibrium.

2. A vehicle as claimed in claim 1 wherein the first mode operates when the steering angle is substantially zero.

3. A vehicle as claimed in claim 1 wherein the transition includes triggering a warning.

4. A vehicle as claimed in claim 1 wherein, the tilt controller will selectively transition into the second mode only when at least one additional constraint is met, the at least one additional constraint including at least one of the following:
- the vehicle speed is less than a first maximum speed;
- a steering position is substantially aligned with a predicted or calculated steering position required for the unstable equilibrium with zero force or torque required from the tilt motor and/or tilt brake between the chassis and the at least one member of the suspension system;
- an acceleration or throttle position is of sufficient magnitude to indicate that the first minimum speed will be exceeded and/or maintained.

5. A vehicle as claimed in claim 1 wherein, the first mode is a "steering" mode and the second mode is a "counter-steering" mode.

6. A vehicle as claimed in claim 1 wherein, in the first mode the tilt angle is actively controlled and in the second mode the tilt angle is primarily passively controlled.

7. A vehicle as claimed in claim 1, wherein in the second mode, the tilt control arrangement only provides force or torque between the chassis portion and the at least one member for safety intervention operations.

8. A vehicle as claimed in claim 1 wherein, when the transition is from the second mode into the first mode, the at least one operating parameter includes vehicle speed,
- the controller selectively transitioning into the first mode when the speed falls below a second minimum speed.

9. A vehicle as claimed in claim 1 wherein, the first mode is a steering mode and the at least a second mode includes the second mode and a third mode;
- the second mode being a normal operation mode or counter-steering mode.

10. A vehicle as claimed in claim 9 wherein the third mode is a safety mode.

11. A vehicle as claimed in claim 9 wherein the third mode is a limited mode.

12. A vehicle as claimed in claim 1 wherein the first mode includes an active tilt adjust mode and a tilt-locked mode.

13. A vehicle as claimed in claim 1 wherein the tilt controller further includes a passive tilt-locked mode.

14. A vehicle as claimed in claim 13 wherein, when the vehicle is started, the tilt controller is in the passive tilt-locked mode, then either remains in passive tilt-locked mode or switches into the first mode of operation, as directed by a driver.

15. A vehicle as claimed in claim 1 wherein, in the first mode, the tilt control arrangement controls the tilt angle of the chassis portion in dependence on at least one operating parameter.

16. A vehicle as claimed in claim 15 wherein the at least one operating parameter includes:
- an indication that the vehicle is in an unstable equilibrium position; and/or
- a force and/or torque between the chassis portion and the tilt motor and/or tilt brake; and/or
- a tilt position and/or tilt velocity and/or tilt acceleration; and/or
- a suspension force and/or a tyre force; and/or
- a longitudinal acceleration and/or a throttle position; and/or
- a steering position and/or lateral acceleration; and/or
- an absolute orientation.

17. A vehicle as claimed in claim 15 wherein the at least one operating parameter is measured, calculated or predicted.

18. A vehicle as claimed in claim 1 wherein, in operation, the first left wheel and the first right wheel is each in contact with the ground at a respective contact patch.

19. A vehicle as claimed in claim 1 wherein the tilt angle of the chassis portion is a rotation of the chassis portion relative to a virtual line between the first left and first right contact patches.

20. A vehicle as claimed in claim 1 wherein the tilt angle of the chassis portion is a measure of the angle between a chassis centre line oriented vertical with respect to the chassis portion and a perpendicular line oriented perpendicular to the virtual line between the first left and first right contact patches.

21. A vehicle as claimed in claim 1 wherein the tilt angle of the chassis portion is a measure of the angle between a chassis centre line oriented vertical with respect to the chassis portion and a perpendicular line perpendicular to a ground plane on which the vehicle rests.

22. A vehicle as claimed in claim 1 wherein the tilt angle of the vehicle is a measure of the rotation of the chassis portion about an axis oriented primarily longitudinally relative to the chassis portion of the vehicle.

23. A vehicle as claimed in claim 1 wherein the unstable equilibrium position is a tilt angle at which all forces and moments on the chassis portion are balanced and there is substantially zero force or torque applied by the tilt motor and tilt brake between the chassis portion and the at least one member of the first suspension arrangement.

24. A vehicle as claimed in claim 1 wherein the unstable equilibrium position is a state of equilibrium of the chassis portion such that when the tilt angle of the chassis portion is slightly displaced, it departs further from the original position.

25. A vehicle as claimed in claim 1 wherein the unstable equilibrium position is a balanced tilt angle position of the chassis portion in which the chassis portion is in a state of equilibrium such that when the chassis portion is slightly displaced from the balanced tilt angle position, it experiences a net force or torque in the same direction as the displacement from the balanced tilt angle position.

26. A vehicle as claimed in claim 1 wherein the tilt brake is selectively operable by a driver of the vehicle.

27. A vehicle as claimed in claim 1 wherein the tilt control arrangement can be controlled by a driver.

28. A vehicle as claimed in claim 1 wherein the at least one member includes at least a first bridge member, the tilt motor adjusting the tilt angle of the chassis portion relative to the first bridge member.

29. A vehicle as claimed in claim 1 wherein the tilt motor is or includes a motor-generator to adjust and damp the tilt angle of the chassis portion relative to the at least one member.

30. A vehicle as claimed in claim 1 wherein the tilt brake selectively locks the tilt angle of the chassis portion relative to the at least one member.

31. A vehicle as claimed in claim 1 wherein, the first left wheel and the first right wheel connected to the chassis portion by at least one member are connected such that they individually tilt in a similar direction to the chassis portion.

32. A vehicle as claimed in claim 1 wherein, the first left wheel and the first right wheel are connected to the chassis portion by the at least one member such that they remain substantially parallel to the chassis portion.

33. A vehicle as claimed in claim 1 wherein the unstable equilibrium position inherently accommodates side slopes.

34. A vehicle as claimed in claim 1 wherein the unstable equilibrium position inherently compensates for cross winds.

35. A vehicle as claimed in claim 1 wherein the chassis portion includes a driver seat and a passenger seat position.

36. A vehicle as claimed in claim 35 further including at least one passenger seat position sensor to detect a presence or weight of a passenger and/or a presence or weight of additional batteries.

37. A vehicle as claimed in claim 1 wherein tilt control arrangement includes a tilt damper.

38. A vehicle as claimed in claim 1 wherein the at least one operating parameter includes:
- an indication that the vehicle is in an unstable equilibrium position; and/or
- a force and/or torque between the chassis portion and the tilt motor and/or tilt brake; and/or
- a tilt position and/or tilt velocity and/or tilt acceleration; and/or
- a suspension force and/or a tyre force; and/or
- a longitudinal acceleration and/or a throttle position; and/or
- a steering position and/or lateral acceleration; and/or
- an absolute orientation.

39. A vehicle as claimed in claim 1 wherein the at least one operating parameter is measured, calculated or predicted.

* * * * *